US012768802B2

(12) United States Patent
Li et al.

(10) Patent No.: US 12,768,802 B2
(45) Date of Patent: Oct. 20, 2026

(54) EMISSION COMPUTED TOMOGRAPHY DETECTOR ASSEMBLIES AND METHODS THEREOF

(71) Applicant: UNITED IMAGING HEALTHCARE NORTH AMERICA, INC., Houston, TX (US)

(72) Inventors: Hongdi Li, Houston, TX (US); Tiantian Li, Houston, TX (US); Yusheng Li, Houston, TX (US)

(73) Assignee: UNITED IMAGING HEALTHCARE NORTH AMERICA, INC., Houston, TX (US)

( * ) Notice: Subject to any disclaimer, the term of this patent is extended or adjusted under 35 U.S.C. 154(b) by 263 days.

(21) Appl. No.: 18/617,620

(22) Filed: Mar. 26, 2024

(65) Prior Publication Data

US 2025/0076222 A1 Mar. 6, 2025

Related U.S. Application Data

(60) Provisional application No. 63/579,949, filed on Aug. 31, 2023.

(51) Int. Cl.

| | |
|---|---|
| ***G01N 23/00*** | (2006.01) |
| ***G01N 23/046*** | (2018.01) |
| ***G01N 23/20008*** | (2018.01) |

(52) U.S. Cl.

CPC ..... *G01N 23/046* (2013.01); *G01N 23/20008* (2013.01); *G01N 2223/419* (2013.01)

(58) Field of Classification Search

CPC ..................................................... A61B 6/037

See application file for complete search history.

(56) References Cited

U.S. PATENT DOCUMENTS

| | | | | |
|---|---|---|---|---|
| 10,962,661 | B2 | 3/2021 | Li et al. | |
| 11,409,010 | B2 | 8/2022 | Li et al. | |
| 2017/0336519 | A1 | 11/2017 | Frazao et al. | |
| 2019/0154851 | A1 | 5/2019 | Wieczorek et al. | |
| 2019/0212457 | A1* | 7/2019 | Li | G01T 1/1642 |

(Continued)

FOREIGN PATENT DOCUMENTS

| | | | |
|---|---|---|---|
| CN | 209433019 | U | 9/2019 |
| CN | 213240527 | U | 5/2021 |
| CN | 115153601 | A | 10/2022 |

(Continued)

*Primary Examiner* — Dani Fox

(74) *Attorney, Agent, or Firm* — METIS IP LLC

(57) ABSTRACT

The present disclosure provides Emission Computed Tomography (ECT) detector assemblies and related methods. The ECT detector assemblies may include a detector micro-block, a detector block, etc. The detector micro-block may include detector units arranged side by side along a second direction. Each of the detector units may include crystal elements and an optical sensor array. The crystal elements may be arranged in crystal element rows along the second direction and crystal element columns along a first direction perpendicular to the second direction. Each crystal element may have a first end and a second end and extending from the first end to the second end along a third direction perpendicular to the first direction and the second direction. The optical sensor array may include optical sensors arranged along the first direction.

20 Claims, 16 Drawing Sheets

(56) References Cited

U.S. PATENT DOCUMENTS

| | | | |
|---|---|---|---|
| 2023/0055050 | A1 | 2/2023 | Benlloch Baviera et al. |
| 2025/0076222 | A1 | 3/2025 | Li et al. |

FOREIGN PATENT DOCUMENTS

| | | | |
|---|---|---|---|
| CN | 115778418 | A | 3/2023 |
| CN | 116047573 | A | 5/2023 |
| CN | 219126405 | U | 6/2023 |

* cited by examiner

EMISSION COMPUTED TOMOGRAPHY DETECTOR ASSEMBLIES AND METHODS THEREOF

CROSS-REFERENCE TO RELATED APPLICATIONS

This application claims priority to U.S. Provisional Patent Application No. 63/579,949, filed on Aug. 31, 2023, the contents of each of which are incorporated herein by reference.

TECHNICAL FIELD

The present disclosure relates to the field of medical technology, and in particular, to Emission Computed Tomography (ECT) detector assemblies and related methods.

BACKGROUND

The spatial resolution is one of most important performance indices of ECT detectors. Usually, the spatial resolution is improved by reducing the crystal size of crystal elements in the ECT detector. However, reducing the crystal size results in an increase of a count of the crystal elements in the ECT detector, which increases the structural complexity of the ECT detector and the amount of data for image processing, and decreases a temporal resolution of the ECT detector.

Therefore, it is desired to provide ECT detector assemblies and methods for determining depths of interaction (DOIs) in an ECT detector, which can improve the spatial resolution of the ECT detector without increasing the count of the crystal elements in the ECT detector or decreasing the temporal resolution of the ECT detector, thereby improving the accuracy of ECT imaging.

SUMMARY

According to an aspect of the present disclosure, a detector micro-block for emission computed tomography (ECT) is provided. The detector micro-block may include detector units arranged side by side along a second direction. Each of the detector units may include crystal elements and an optical sensor array. The crystal elements may be arranged in crystal element rows along the second direction and crystal element columns along a first direction perpendicular to the second direction. Each crystal element may have a first end and a second end and extending from the first end to the second end along a third direction perpendicular to the first direction and the second direction. The optical sensor array may include optical sensors arranged along the first direction. The first ends of the crystal elements in each crystal element row may be optically coupled with one optical sensor of the optical sensor array, and an optical bridge may be configured at the second ends of the crystal elements in each crystal element column.

In some embodiments, for each crystal element column of each detector unit, an optical separator may be configured between each pair of adjacent crystal elements in the crystal element column, and the optical separator may extend from the first ends of the corresponding pair of adjacent crystal elements without reaching the second ends of the corresponding pair of adjacent crystal elements.

In some embodiments, the second ends of the crystal elements in each crystal element column may be integrated into an integral part that serves as the optical bridge.

In some embodiments, the optical bridge of each crystal element column may include a light transmitter configured between each pair of adjacent crystal elements in the crystal element column. The light transmitter may extend from the second ends of the corresponding pair adjacent crystal elements to the optical separator between the corresponding pair of adjacent crystal elements.

In some embodiments, for each detector unit, an optical separator may be configured between each pair of adjacent crystal element columns in the detector unit. The optical separator may extend from the first ends of the crystal elements in the corresponding pair of adjacent crystal element columns to the second ends of the crystal elements in the corresponding pair of crystal element columns.

In some embodiments, for each crystal element column of each detector unit, an optical separator may be configured between each pair of adjacent crystal elements in the crystal element column. The optical separator may extend from the first ends of the corresponding pair of adjacent crystal elements to the second ends of the corresponding pair of adjacent crystal elements, and the optical bridge may include a light transmitter covering the second ends of the crystal elements in the crystal element column.

In some embodiments, a second optical bridge may be configured between each pair of adjacent detector units in the detector micro-block.

In some embodiments, an optical separator may be configured between each pair of adjacent detector units in the detector micro-block. The optical separator may extend from the second ends of the crystal elements in the corresponding pair of adjacent detector units without reaching the first ends of the crystal elements in the corresponding pair of adjacent detector units.

In some embodiments, for each detector unit, two crystal elements may be arranged in each crystal element column of the detector unit along the first direction, and two crystal elements may be arranged in each crystal element row of the detector unit along the second direction.

In some embodiments, each crystal element may have a long side along the first direction and a short side along the second direction, the length of the long side along the first direction may be larger than the length of the short side along the second direction.

In some embodiments, a ratio of the length of the long side along the first direction and the length of the short side along the second direction may be greater than 1 and less than 5.

According to another aspect of the present disclosure, a detector block for emission computed tomography (ECT) is provided. The detector block may include a plurality of detector micro-blocks arranged in a block array.

In some embodiments, the short sides of the crystal elements in the plurality of detector micro-blocks may be parallel to each other.

In some embodiments, the short sides of the crystal elements in one or more first detector micro-blocks of the plurality of detector micro-blocks may be perpendicular to the short sides of the crystal elements in one or more second detector micro-blocks of the plurality of detector micro-blocks.

In some embodiments, each pair of adjacent detector micro-blocks in the plurality of detector micro-blocks may include one first detector micro-block and one second detector micro-block to form a checkerboard structure.

In some embodiments, the detector block may include first sub-blocks and second sub-blocks, each of the first sub-blocks and the second sub-blocks may include multiple detector micro-blocks, the detector micro-blocks of each first sub-block may have a first arrangement manner, the detector micro-blocks of each second sub-block may have a second arrangement manner different from the first arrangement manner.

According to still another aspect of the present disclosure, a method for identifying positions of photon gamma interactions is provided. The method may be implemented on a computing machine having one or more processors and one or more storage devices. The method may include obtaining output information of the optical sensors of the detector micro-block; and determining, based on the output information of the optical sensors, position information of a photon gamma interaction that occurs in the crystal elements of the detector micro-block.

According to still another aspect of the present disclosure, a method for identifying positions of photon gamma interactions is provided. The method may be implemented on a computing machine having one or more processors and one or more storage devices. The method may include obtaining output information of the optical sensors of the plurality of detector micro-blocks of the detector block; dividing the output information into a first subset and a second subset, the first subset corresponding to the optical sensors of the one or more first detector micro-blocks, the second subset corresponding to the optical sensors of the one or more second detector micro-blocks; generating a first ECT image based on the first subset; and generating a second ECT image based on the second subset.

In some embodiments, a first image resolution of the first ECT image along the second direction is greater than a second image resolution of the second ECT image along the second direction, and the first image resolution of the first ECT image along the first direction is less than the second image resolution of the second ECT image along the first direction In some embodiments, the method may further include generating a third ECT image based on the first subset and the second subset.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein.

DETAILED DESCRIPTION

Figure 1:
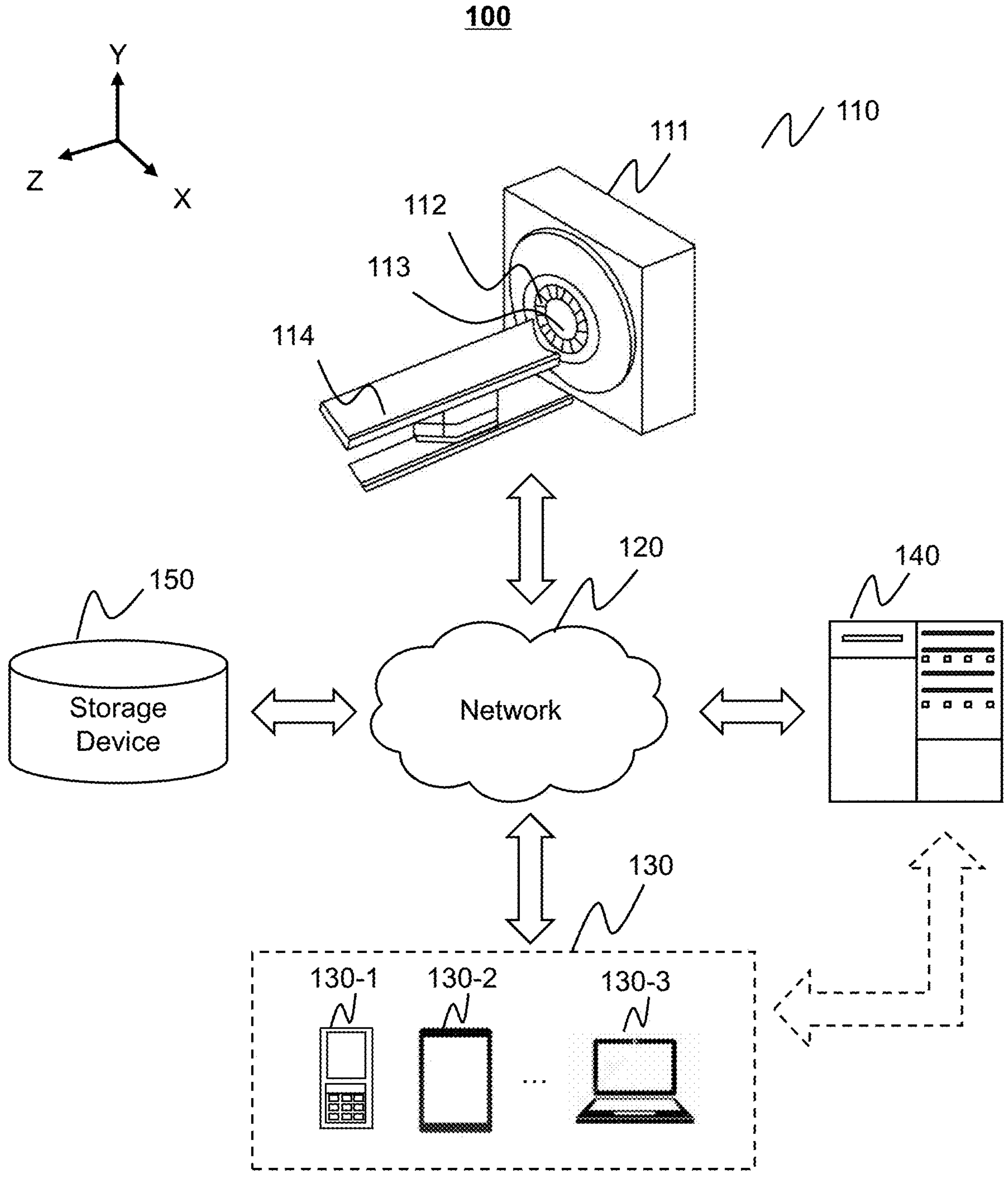
FIG. 1 is a schematic diagram illustrating an exemplary imaging system according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system," "device," "unit," and/or "module" as used herein is a manner used to distinguish different components, elements, parts, sections, or assemblies at different levels. However, if other words serve the same purpose, the words may be replaced by other expressions.

As shown in the present disclosure and claims, the words "one," "a," "a kind," and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

It will be understood that, although the terms "first," "second," "third," "fourth," etc., may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention.

Spatial and functional relationships between elements (for example, between crystal elements) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.). As used herein, the term "and/or" includes any and all combinations of one or more of the associated listed items.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

For illustration purposes, the following description is provided to help better understanding an imaging process. It is understood that this is not intended to limit the scope of the present disclosure. For persons having ordinary skills in the art, a certain amount of variations, changes and/or modifications may be deducted under guidance of the present disclosure. Those variations, changes and/or modifications do not depart from the scope of the present disclosure.

The present disclosure relates to ECT detector assemblies and methods for determining a position of a photon gamma interaction in an ECT detector. The ECT detector assemblies include a detector micro-block, a detector block, a detector module, and an ECT detector. The detector micro-block in the present disclosure refers to the smallest unit or basic unit for assembling the ECT detector. In some embodiments, a plurality of detector micro-blocks may form/constitute a detector block, a plurality of detector blocks may form a detector module (e.g., a detector ring), and a plurality of detector modules may be assembled as a detector of an ECT device (i.e., a PET detector). For example, 64 detector micro-blocks may form an 8×8 array to form a detector block, 5 detector blocks may form a detector module of a ring shape, and 34 detector modules may form a detector. It should be understood that a count of the above components (e.g., the detector micro-block, the detector block, the detector module, etc.) may be adjusted according to actual situation(s). In addition, the terms "micro-block," "block," "module," "unit," etc., herein are used to distinguish different components, elements, parts, sections, or assemblies at different levels. However, if other terms serve the same purpose, the terms may be replaced by other expressions.

In some embodiments, a detector micro-block may include detector units arranged side by side along a second direction (or a left-to-right direction). Each of the detector units may include crystal elements and an optical sensor array. The crystal elements may be arranged in crystal element columns along a first direction (or front-to-rear direction) perpendicular to the second direction and crystal element rows along the second direction. Each crystal element may have a first end and a second end, and extend from the first end to the second end along a third direction (or a top-to-bottom direction) perpendicular to the first direction and the second direction. The optical sensor array may include optical sensors arranged along the first direction. The first ends of the crystal elements in each crystal element row may be optically coupled with one optical sensor of the optical sensor array, and an optical bridge may be configured (located) at the second ends of the crystal elements in each crystal element column. In this way, the detector micro-block can have a U-shaped structure (or a substantially inverted U-shaped structure), and when a photon gamma interaction occurs in a crystal element, output information of the optical sensors can be used to determine the depth of the photon gamma interaction along an extension direction of the crystal element, thereby improving the imaging resolution.

In some embodiments, each crystal element in the detector micro-block may have a long side along the first direction and a short side along the second direction, and the length of the long side along the first direction may be larger than the length of the short side along the second direction. Therefore, a plurality of detector micro-blocks of a detector block can be arranged in different orientations, and output information with different resolutions can be obtained, which can increase the richness of the output information, thereby improving the accuracy of the position information of photon gamma interactions and the ECT images generated based on the output information.

FIG. 1 is a schematic diagram illustrating an exemplary imaging system 100 according to some embodiments of the present disclosure.

As shown in FIG. 1, in some embodiments, the imaging system 100 may include an imaging device 110, a network 120, one or more terminal devices 130, a processing device 140, and a storage device 150. In some embodiments, the components of the imaging system 100 may be connected to each other via the network 120. Alternatively or additionally, the components of the imaging system 100 may be directly connected to each other.

The imaging device 110 may scan an object and generate scanning data corresponding to the object. The object may include one or more organs, one or more types of tissues, or the like, of a patient. In some embodiments, the imaging device 110 may be a medical scanning device, for example, a PET device, a single photon emission computed tomography (SPECT) device, a positron emission tomography-computed tomography (PET-CT) device, a positron emission tomography-magnetic resonance imaging (PET-MRI) device, etc.

The imaging device 110 may include a gantry 111, a detector 112, a scanning area 113, and a table 114. The object may be placed on the table 114 (e.g., an examination bed). The table 114 may deliver the object to a target location in the scanning area 113. The detector 112 may detect radiation rays (e.g., gamma photons) emitted from the object in the scanning area 113. In some embodiments, the detector 112 may include a plurality of detector modules. The detector modules may be arranged in a suitable configuration, including but not limited to a ring (e.g., a detector ring), a rectangle, a triangle, an array, etc. In some embodiments, the detector 112 may include a plurality of crystal elements (e.g., scintillation crystals), a plurality of optical-sensors, and one or more optical separators as described elsewhere in the present disclosure.

For the convenience of description, a coordinate system including an X axis, a Y axis, and a Z axis is introduced. As shown in FIG. 1, the Z axis direction refers to a direction along which the object is moved into and out of the scanning area 113. The X axis direction and the Y axis direction may be perpendicular to each other, and form an x-y plane.

In application, a tracer (e.g., a radioactive isotope) may be injected into an object (via, for example, blood vessels of a patient). The atoms of the tracer may be incorporated into biologically active molecules. The biologically active molecules may gather in tissue of the patient. When a sufficient amount of the molecules are estimated to have gathered in the tissue (e.g., in an hour), the patient may be positioned on the table 114. The radioactive isotope may undergo a positron emission decay (i.e., the beta decay) and emits positrons. The positrons may interact with electrons inside the tissue (the interaction between positrons and electrons is called annihilation). The annihilations of the electrons and positrons may each produce a pair of annihilation photons that move in approximately opposite directions. When the annihilation photons strike into a crystal element of the detector 112, the annihilation photons may be absorbed by the crystal element, generating bursts of optical photons (e.g., visible light photons) that, in turn, may be detected by one or more optical sensors. The interaction between the annihilation photons and the crystal element that produces bursts of optical photons may be referred to as a photon gamma interaction herein. The depth of the photon gamma interaction along an extension direction of the crystal element where the photon gamma interaction occurs may be referred to as a depth of interaction (DOI).

An image may be generated by the processing device 140 based on information associated with the annihilation photons. For example, the processing device 140 may determine time-of-flight (TOF) information associated with each of the pairs of annihilation photons. The processing device 140 may also determine DOI information based on output information of the optical sensors in the detector 112. The processing device 140 may further determine a location where the annihilation happens based on the TOF information and the DOI information. After the locations of the annihilations are determined, the processing device 140 may generate a projection image (also referred to as a sinogram) based on the locations of the annihilations. The processing device 140 may reconstruct images based on the projection image and reconstruction techniques such as a filtered back projection (FBP) algorithm. The reconstructed images may indicate the tissue that contains a large number of biologically active molecules of the tracer (also referred to as tracer molecules). In some embodiments, a number of tracer molecules in a region may be related to biological functions of the tissues in the region. For example, if fluorodeoxyglucose (FDG) is used as the tracer in a PET scan, the number of tracer molecules in a region may be proportional to the rate of metabolism of glucose in the region. As tumors generally consume a huge amount of glucose, the region with a large number of tracer molecules may be identified in a reconstructed image as tumor tissue.

The network 120 may include any suitable network that may facilitate the exchange of information and/or data between the components of the imaging system 100. In some embodiments, at least one component of the imaging system 100 (e.g., the imaging device 110, the terminal device(s) 130, the processing device 140, the storage device 150, etc.) may communicate information and/or data with at least one other component of the imaging system 100 via the network 120. For example, the processing device 140 may obtain image data (e.g., the TOF information, energy information, the DOI information) from the imaging device 110 via the network 120. The network 120 may include a public network (e.g., the Internet), a private network (e.g., a local area network (LAN), a wired network, a wireless network (e.g., an 802.11 network, a Wi-Fi network, etc.), a frame relay network, a virtual private network (VPN), a satellite network, a telephone network, routers, hubs, switches, a fiber optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, etc., or any combination thereof. In some embodiments, the network 120 may include at least one network access point. For example, the network 120 may include a wired network access point and/or a wireless network access point, such as a base station and/or an Internet exchange point. The at least one component of the imaging system 100 may be connected to the network 120 via the access point(s) to exchange data and/or information.

The terminal device(s) 130 may be in communication and/or connection with the imaging device 110, the processing device 140, and/or the storage device 150. For example, a user may interact with the imaging device 110 via the terminal device(s) 130 to control one or more components of the imaging device 110. In some embodiments, the terminal device(s) 130 may include a mobile apparatus 130-1, a tablet computer 130-2, a laptop computer 130-3, or the like, or any combination thereof. For example, the mobile apparatus 131-1 may include a mobile control handle, a personal digital assistant (PDA), a smartphone, or the like, or any combination thereof. In some embodiments, the terminal device(s) 130 may be part of the imaging device 110 or the processing device 140.

The processing device 140 may process data and/or information obtained from the imaging device 110, the one or more terminal devices 130, the storage device 150, or other components of the imaging system 100. For example, the processing device 140 may process the image data (e.g., the output information, the TOF information, the energy information, the DOI information, etc.) and reconstruct the image based on the image data. In some embodiments, the processing device 140 may be a single server or a server group. The server group may be centralized or distributed. In some embodiments, the processing device 140 may be local or remote. For example, the processing device 140 may access the information and/or data from the imaging device 110, the one or more terminal devices 130, and/or the storage device 150 via the network 120. As another example, the processing device 140 may be directly connected to the imaging device 110, the one or more terminal devices 130, and/or the storage device 150 to access the information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or any combination thereof. In some embodiments, the processing device 140 or a portion of the processing device 140 may be integrated into the imaging device 110.

The processing device 140 may include a processor, a memory module, an input/output (I/O), and a communication port. The processor may execute computer instructions (e.g., program code) and perform functions of the processing device 140 described herein. The computer instructions may include, for example, routines, programs, objects, components, data structures, procedures, modules, functions, etc. which perform particular functions described herein. The storage module may store the data/information obtained from the imaging device 110, the one or more terminal devices 130, the storage device 150, and/or any other component of the imaging system 100. In some embodiments, the storage module may include mass storage, removable storage, volatile read-and-write memory, read-only memory (ROM), or the like, or any combination thereof. The I/O may input and/or output signals, data, information, etc. In some embodiments, the I/O may enable a user interaction with the processing device 140. In some embodiments, the I/O may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. The communication port may be connected to a network (e.g., the network 120) to facilitate data communications. The communication port may establish connections between the processing device 140 and the imaging device 110, the one or more terminal devices 130, and/or the storage device 150. The connection may be a wired connection, a wireless connection, any other communication connection that enables data transmission and/or reception, and/or any combination of these connections.

The storage device 150 may store data, instructions, and/or any other information. In some embodiments, the storage device 150 may store the data obtained from the imaging device 110, the one or more terminal devices 130, and/or the processing device 140. In some embodiments, the storage device 150 may store data and/or instructions used by the processing device 140 to execute or use to accomplish the exemplary methods described in the present disclosure. In some embodiments, the storage device 150 may store the image data (e.g., the output information, the TOF information, the energy information, the DOI information, etc.) obtained from the imaging device 110. In some embodiments, the storage device 150 may include mass storage, removable memory, volatile read-write memory, read-only memory (ROM), etc., or any combination thereof. In some embodiments, the storage device 150 may be connected to the network 120 to communicate with at least one other component (e.g., the imaging device 110, the one or more terminal devices 130, and the processing device 140) of the imaging system 100. In some embodiments, the storage device 150 may be a portion of the processing device 140.

It should be noted that the above description is merely provided for the purposes of illustration, and is not intended to limit the scope of the present disclosure. For persons having ordinary skills in the art, multiple variations and modifications may be made under the teachings of the present disclosure. Features, structures, methods, and other characteristics of the exemplary embodiments described herein may be combined in various ways to obtain additional and/or alternative exemplary embodiments. For example, the imaging system 100 may also include a plurality of other components, such as a patient positioning unit, a data acquisition electronic, a power supply, and other devices or units. However, those variations and modifications do not depart from the scope of the present disclosure.

Figure 2:
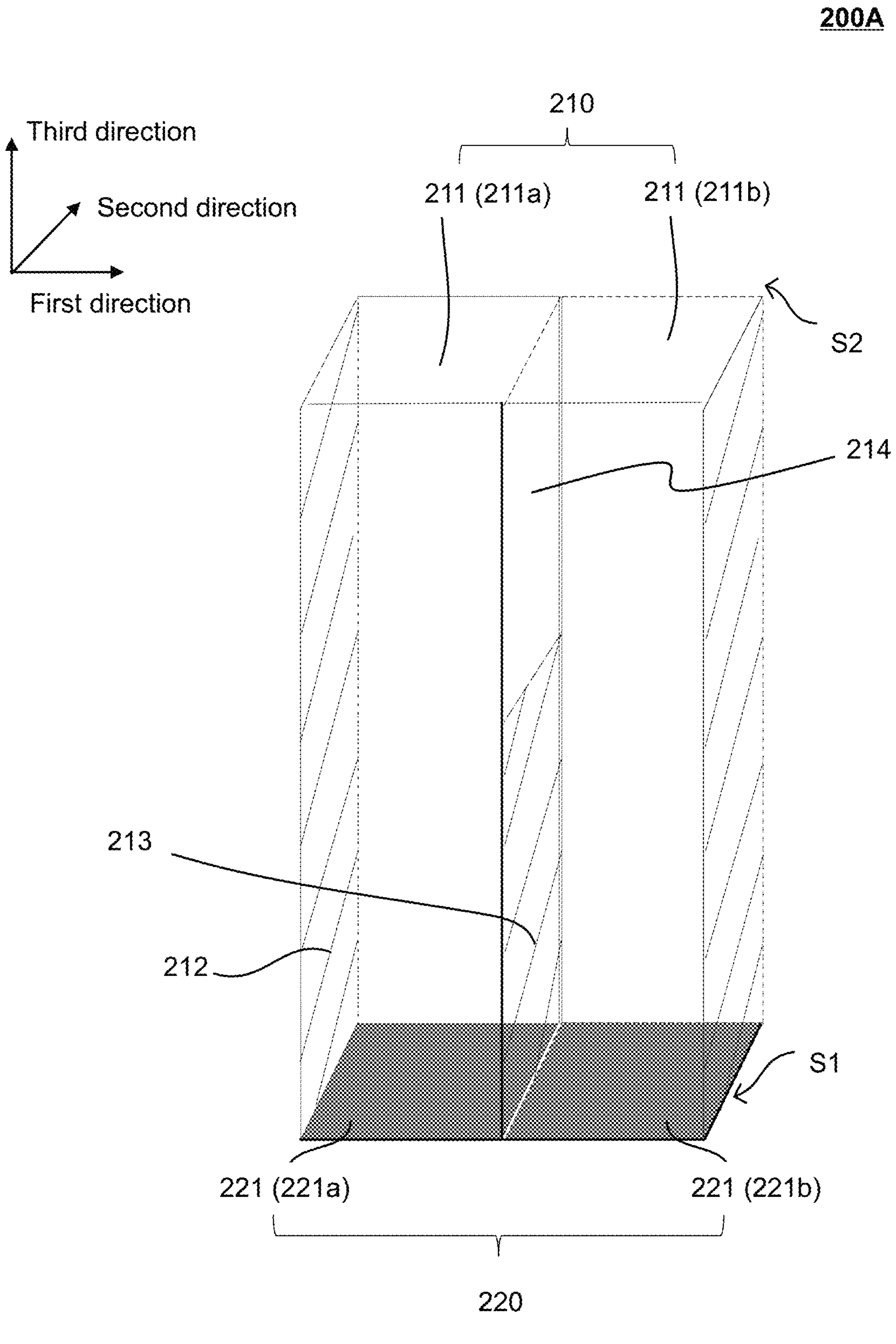
FIG. 2 is a schematic diagram illustrating an exemplary crystal group according to some embodiments of the present disclosure.

FIG. 2 is a schematic diagram illustrating an exemplary crystal group according to some embodiments of the present disclosure.

In some embodiments, a detector (e.g., detector 112) may include one or more crystal groups 200A. The crystal group 200A may be configured to detect annihilation photons generated by annihilation events during a scan of an object.

As shown in FIG. 2, the crystal group 200A may include a crystal array 210, an optical sensor array 220 (in a dark region as shown in FIG. 2) optically coupled with the crystal array 210, one or more first optical separators 212, and one or more second optical separators 213. The crystal array 210 may include a plurality of crystal elements 211 (e.g., crystal elements 211*a* and 211*b*). Each of the plurality of crystal elements 211 may be configured to receive annihilation photons (e.g., gamma photons) from the object. For purposes of illustration, the crystal array 210 shown in FIG. 2 only includes two crystal elements 211, which is not intended to limit the scope of the present disclosure. The crystal group 200A may include any number or count of crystal elements 211. For example, the crystal array 210 may include three or more crystal elements 211. The optical sensor array 220 may be configured as a plurality of optical sensors 221 to detect optical photons emitted from first ends of the crystal element 211.

The crystal elements 211 of the crystal array 210 may be arranged along a first direction to form a crystal element column as shown in FIG. 2. Correspondingly, a crystal group may be referred to as a crystal element column. Each crystal element 211 may have a first end S1 (e.g., a bottom end) and a second end S2 (e.g., an upper end), and extend from the first end S1 to the second end S2 along a third direction (e.g., a bottom-to-upper direction). The first end S1 of the crystal element 211 refers to an end through which an optical photon exits the crystal element 211 to enter an optical sensor 221. The second end S2 of the crystal element 211 refers to an end through which radiation rays (e.g., gamma rays caused by annihilation events) enter the crystal element 211. The second end S2 of a crystal element 211 may be closer to the object to be scanned than the first end S1 of the crystal element 211. In some embodiments, the second end S2 of the crystal element 211 may be coated with a light-reflecting material to completely or substantially completely prevent photons in the crystal element 211 from exiting from the second end S2 of the crystal element 211.

The crystal element 211 may be made of any material that can absorb radiation rays and emit a portion of the absorbed radiation rays as light. For example, the crystal element 211 may be made of, for example, bismuth germanium oxide (BGO), lutetium oxyorthosilicate (LSO), lutetium-yttrium oxyorthosilicate (LYSO), lutetium-gadolinium oxyorthosilicate (LGSO), gadolinium oxyorthosilicate (GSO), yttrium oxyorthosilicate (YSO), barium fluoride, sodium iodide, cesium iodide, lead tungstate, yttrium aluminate, lanthanum chloride, lutetium-aluminum perovskite, lutetium disilicate, lutetium aluminate, lutetium iodide, thallium bromide, or the like, or any combination thereof. Different crystal elements 211 may be made of the same material or different materials.

Sizes and/or shapes of the different crystal elements 211 may be the same or different. For example, the crystal element 211 of the crystal array 210 may have a uniform size and shape. As another example, different crystal elements 211 may have different lengths. The length of the crystal element 211 refers to a size of the crystal element 211 along its extension direction (i.e., the third direction). In some embodiments, the size and/or the shape of the crystal element 211 may vary according to one or more conditions including, for example, an image resolution of the detector, a size of the detector, or the like, or any combination thereof. Merely by way of example, the crystal element 211 may have different lengths in the first direction and the second direction in order to obtain different spatial resolutions.

In some embodiments, a single end of each crystal element 211 of the crystal array 210 may be optically coupled with one optical sensor 221. Each of the plurality of optical sensors 221 may be optically coupled with one or more crystal elements 211 of the crystal array 210. Different optical sensors 221 may be coupled with the same number (or count) or different number (or counts) of crystal elements 211. When the optical sensors 221 are coupled with the plurality of crystal elements 211, the optical sensors 221 may determine output information corresponding to each of the plurality of crystal elements 211. The output information may reflect the energy of an optical photon in a corresponding crystal element 211 that is excited by a photon gamma interaction and detected by the optical sensor 221.

An optical sensor 221 may be coupled with corresponding crystal element(s) 211 in any suitable manner. For example, the optical sensor 221 may directly contact the corresponding crystal element(s) 211. As another example, the optical sensor 221 may be fixed to the corresponding crystal element(s) 211 through one or more adhesive materials (e.g., a light-transmitting glue). As still another example, the optical sensor 221 may be single-end-coupled with the corresponding crystal element(s) 211 via a light-transmitting material (e.g., a piece of glass). In some embodiments, one or more optical sensors 221 may be optically coupled with a crystal element 211 (e.g., the crystal element 211*a* or 211*b*) to receive photons from a single end (e.g., the first end S1) of the crystal element 211. A detector that uses one or more optical sensors 221 to detect photons from a single end of each of the crystal elements 211 may be referred to as a detector having a single-end read-out structure.

In some embodiments, the optical sensor 221 may include a phototube, a photomultiplier tube (PMT), a photodiode, an active pixel sensor, a bolometer, a gaseous ionization detector, a phototransistor, a phototransistor, an avalanche photodiode (APD), a single-photon avalanche photodiode (SPAD), a silicon photomultiplier (SiPM), a digital silicon photomultiplier (DSiPM), or the like, or any combination thereof. Different optical sensors 221 may be of the same type or different types of optical sensors.

In some embodiments, light sharing between two adjacent (or neighboring) crystal elements 211 belonging to the same crystal group 200A may be allowed, while light sharing between two adjacent crystal groups is restricted or substantially restricted, so as to determine a position of the photon gamma interaction. If no other crystal elements are located between the two crystal elements 211, the two crystal elements 211 may be regarded as being adjacent to each other or neighboring. In some embodiments, the two adjacent or neighboring crystal elements may be spaced apart by void space, an item (e.g., a film, a coating, a layer of a material different from the material of any crystal element of the neighboring crystal elements, etc.) other than the crystal element, or the like, or any combination thereof. Merely by way of example, space may exist between the two neighboring crystal elements of the same crystal group, a portion of the space may be filled with an optical separator (e.g., the second optical separator 213 described elsewhere in the present disclosure), and a portion of the space may be void. As another example, space may exist between the two neighboring crystal elements of the same crystal group, a portion of the space may be filled with the optical separator (e.g., the second optical separator 213 described elsewhere in the present disclosure), and another portion of the space may be filled with a light transmitter. The light transmitter may be any substance (e.g., glass, an antireflection material) that allows light to pass through, which realizes the light sharing between the two adjacent crystal elements of the same crystal group. As shown in FIG. 2, a portion of a space between the crystal elements 211*a* and 211*b* is filled with a light transmitter 214, and photons may pass through the light transmitter 214 and travel between the crystal elements 211*a* and 211*b*. The light transmitter 214 may be configured between each pair of adjacent crystal elements in the crystal group 200A (or crystal element column), and the light transmitter 214 may extend from the second ends S2 of the corresponding pair of adjacent crystal elements to the second optical separator 213 between the corresponding pair of adjacent crystal elements.

In some embodiments, a width of the second optical separator 213 and a width of the light transmitter 214 may be determined according to actual needs of the use. Taking the light transmitter 214 as an example, the width of the light transmitter 214 refers to a size along the first direction. For example, the width of the light transmitter 214 may be determined based on a length of the crystal element. For instance, the width of the light transmitter 214 may be positively correlated with a length of the crystal element 211. Merely by way of example, the width of the light transmitter 214 may be within a certain range, such as, a range from 1 to 5 millimeters (mm), a range from 1.5 to 4.5 mm, a range from 2 to 4 mm, a range from 2.5 to 3.5 mm, etc. A length of the light transmitter 214 may be determined according to the second optical separator 213. The length of the light transmitter 214 refers to a length of the light transmitter 214 along the third direction. For example, in the same crystal group, the sum of the length of the light transmitter 214 and a length of the second optical separator 213 may be equal to a length of either crystal element in the crystal group.

If no other crystal groups are located between the two crystal groups, the two crystal groups may be regarded as being adjacent to each other or neighboring. In some embodiments, the two adjacent or neighboring crystal groups may be spaced apart by void space, an item (e.g., a film, a coating, a layer of a material different from the material of any crystal element of the crystal elements of the neighboring crystal groups, etc.) other than the crystal element, or the like, or any combination thereof. Merely by way of example, space may exist between the two neighboring crystal groups, a portion of the space may be filled with an optical separator (e.g., the first optical separator described elsewhere in the present disclosure), and another portion of the space may be void. As another example, the space between the two neighboring crystal groups may be substantially completely filled with the optical separator (e.g., the first optical separator described elsewhere in the present disclosure).

To control light transmission between the two neighboring crystal elements 211 or the two neighboring crystal groups, a plurality of optical separators may be used in crystal group 200A. An optical separator may include a reflective film, a reflective foil, a reflective coating (e.g., a white reflective coating), or any other material that can prevent or substantially prevent the light transmission. A shaded area shown in FIG. 2 represents one or more optical separators configured to block or partially block the light transmission between the crystal elements 211. For example, the first optical separator 212 may substantially or completely cover a side surface of the crystal element 211*a* to prevent optical photons in the crystal group 200A from traveling from the side surface facing an adjacent crystal group to the adjacent crystal group (not shown in FIG. 2). A first length of the first optical separator 212 may be equal to the length of the crystal element 211*a*.

The second optical separator 213 may be configured between each pair of adjacent crystal elements in the crystal group (or the crystal element column). The second optical separator 213 may extend from the first ends S1 of the corresponding pair of adjacent crystal elements without reaching the second ends S2 of the corresponding pair of adjacent crystal elements to partially block transmission of optical photons between the corresponding pair of adjacent crystal elements. For example, the second optical separator 213 may be located between the crystal elements 211*a* and 211*b*. The second optical separator 213 may extend along the third direction from the first ends S1 of the crystal elements 211*a* and 211*b*. A second length of the second optical separator 213 may be less than the length of the crystal elements 211*a* and 211*b*, such that the second optical separator 213 may partially block the transmission of optical photons between the crystal elements 211*a* and 211*b*. The first length of the first optical separator 212 may be larger than the second length of the second optical separator 213. The length of the optical separator refers to a length of the optical separator along an extension direction (i.e., the third direction) of the crystal element 211.

In some embodiments, the length of the second optical separator 213 may be equal to or larger than half the length of at least one of the crystal elements 211*a* and 211*b*. In some embodiments, the length of the second optical separator 213 may be equal to N % of the length of the crystal element 211*a* or 211*b*. N may have any suitable positive value (a value of N is less than 100). In some embodiments, N may be within a certain range, such as, a range from 30 to 90, a range from 50 to 85, etc. For example, N may be 30, 40, 50, 60, 70, 80, 85, or 90. N may be a parameter used in the position determination of a photon gamma interaction in the crystal group 200A. In some embodiments, N may be a default parameter stored in a storage device (e.g., the storage device 150). Alternatively, N may be set manually or determined by one or more components of the imaging system 100 according to different situations. In some embodiments, a material of the second optical separator 213 may be the same as or different from a material of the first optical separator 212.

It should be noted that the example illustrated in FIG. 2 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the crystal array 210 may include any suitable number or count of the crystal elements 211. For example, the crystal array 210 may include an even number or count (e.g., two, four, six, eight, or twelve) of the crystal elements 211. The crystal elements 211 may be arranged in any suitable manner. For example, the crystal elements 211 of the crystal array 210 may be arranged along a second direction to form crystal element rows.

Figure 3A:
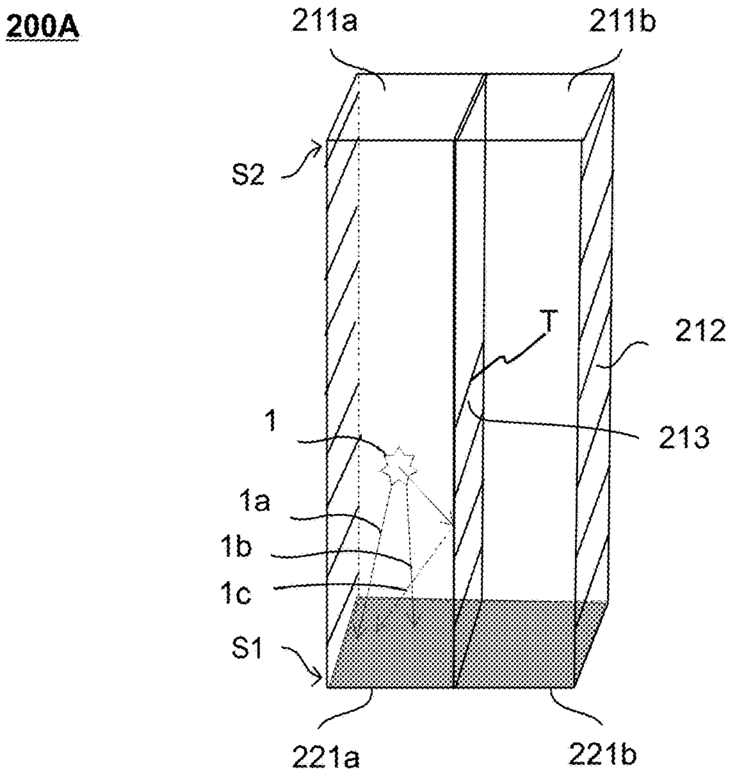
FIGS. 3A and 3B are schematic diagrams illustrating photon gamma interactions occurred in an exemplary crystal group according to some embodiments of the present disclosure.
Figure 3B:
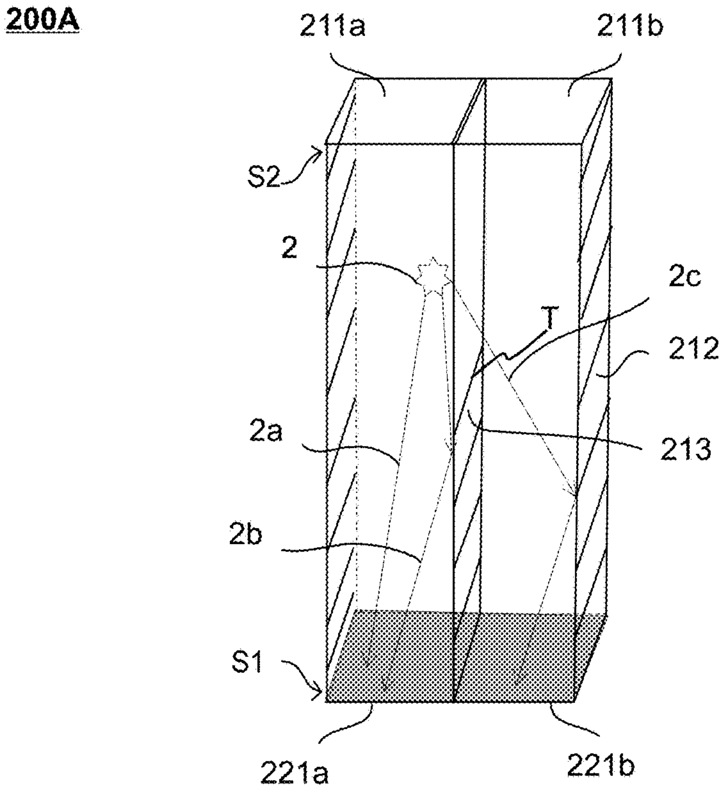

FIG. 3A and FIG. 3B are schematic diagrams illustrating photon gamma interactions occurred in an exemplary crystal group according to some embodiments of the present disclosure.

A photon gamma interaction occurred in the crystal group 200A may excite one or more optical photons that may be detected by the corresponding optical sensors 221*a* and/or 221*b* as described elsewhere in the present disclosure. The number or count of optical photons detected by the optical sensor 221*a* or 221*b* may be correlated with a position of the photon gamma interaction in the crystal group 200A. For example, as shown in FIG. 3A, the photon gamma interaction 1 occurs at a location closer to the first end S1 (or lower) than a top of the second optical separator 213 (denoted as T in FIG. 3A). The optical photon(s) produced by the photon gamma interaction 1 may be blocked or substantially blocked by the second optical separator 213 from traveling into the crystal element 211*b*. Accordingly, all or almost all the optical photons excited by the photon gamma interaction 1 may be detected by the optical sensor 221*a*. Merely by way of example, as shown in FIG. 3A, the photon gamma interaction 1 may generate a plurality of optical photons. A portion of the plurality of optical photons may travel along photon travel paths 1*a* and 1*b* directly to the optical sensor 221*a* and be detected by the optical sensor 221*a*. A portion of the plurality of optical photons may travel along a photon travel path 1*c*, be reflected by the second optical separator 213, and then be detected by the optical sensor 221*a*.

As another example, as shown in FIG. 3B, a photon gamma interaction 2 occurs at a position farther away from the first end S1 (or higher) than the top of the second optical separator 213 (denoted as T in FIG. 3B). The optical photons excited by the photon gamma interaction 2 may be partially blocked by the second optical separator 213 from traveling into the crystal element 211*b*. Accordingly, the optical photons may be detected by both the optical sensor 221*a* and the optical sensor 221*b*. Merely by way of example, the photon gamma interaction 2 may generate a plurality of optical photons. A portion of the plurality of optical photons may be directly detected by the optical sensor 221*a* along the photon travel paths 2*a* and 2*b*, and a portion of the optical photons may travel along a photon travel path 2*c* into the crystal element 211*b* and be detected by the optical sensor 221*b*.

Figure 4A:
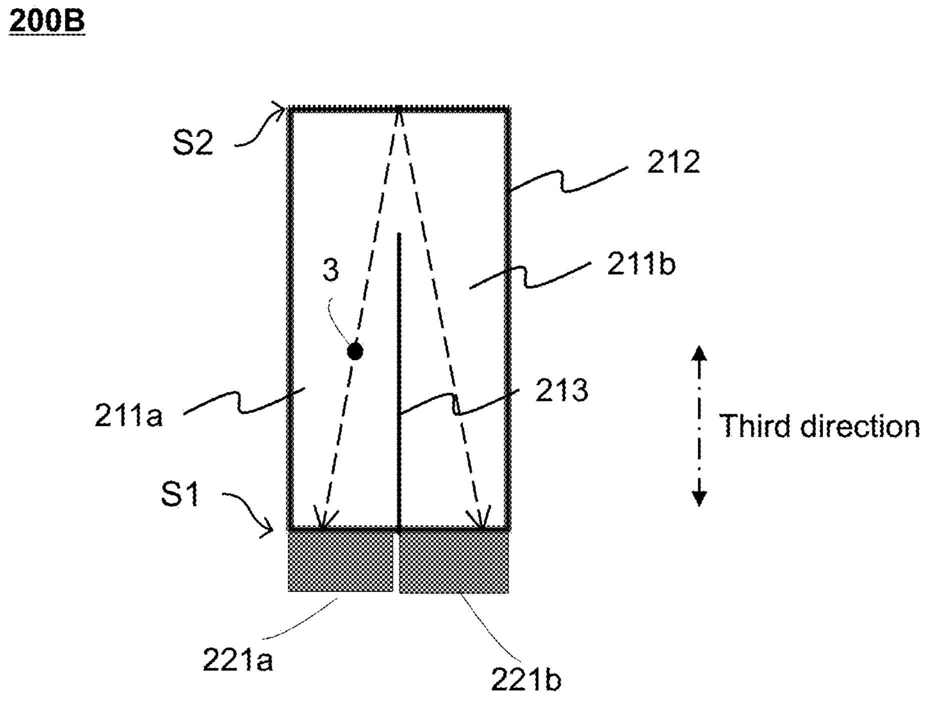
FIG. 4A is a schematic diagram illustrating an exemplary crystal group according to some embodiments of the present disclosure.

FIG. 4A is a schematic diagram illustrating an exemplary crystal group 200B according to some embodiments of the present disclosure.

The crystal group (or crystal element column) 200B may be similar to the crystal group 200A described in FIGS. 2-3B, except that the second end S2 of the crystal elements 211*a* and 211*b* may be integrated into a single end. In some embodiments, the crystal group 200B may be manufactured by partially cutting a single crystal block into the crystal elements 211*a* and 211*b*. The cut may be extended from the first end S1 of the crystal block toward its second end S2, and the cut may extend to a depth without reaching the second end S2. That is, the second ends of the crystal elements 211*a* and 211*b* in each crystal group 200B (or crystal element column) may be integrated into an integral part that serves as the optical bridge. The second optical separator 213 may be made by filling the cutting grooves of the crystal block with one or more light-reflecting materials. In such a case, the light transmission between the crystal elements 211*a* and 211*b* may be allowed in the uncut portion near the second end S2 while being prevented in the cut portion near the first end S1. The first optical separator(s) 212 may be formed by coating other side surfaces of the crystal elements 211*a* and/or 211*b* with a light-reflecting material. That is, the light-reflecting material may be filled between the crystal group 200B and neighboring crystal group(s). In such a case, the light transmission between the crystal group 200B and the neighboring crystal group(s) (not shown in FIG. 4A) may be prevented.

In some embodiments, a location of a photon gamma interaction 3 in the crystal group 200B may be determined based on output information of the optical sensors 221*a* and 221*b*. The output information may reflect the energy of optical photons excited by the photon gamma interaction 3 and detected by the optical sensors 221*a* and/or 221*b*. In some embodiments, the crystal element in which the photon gamma interaction 3 occurs (also referred to as a target crystal element) and/or a depth of the photon gamma interaction 3 in the target crystal element may be determined based on the output information.

Figure 4B:
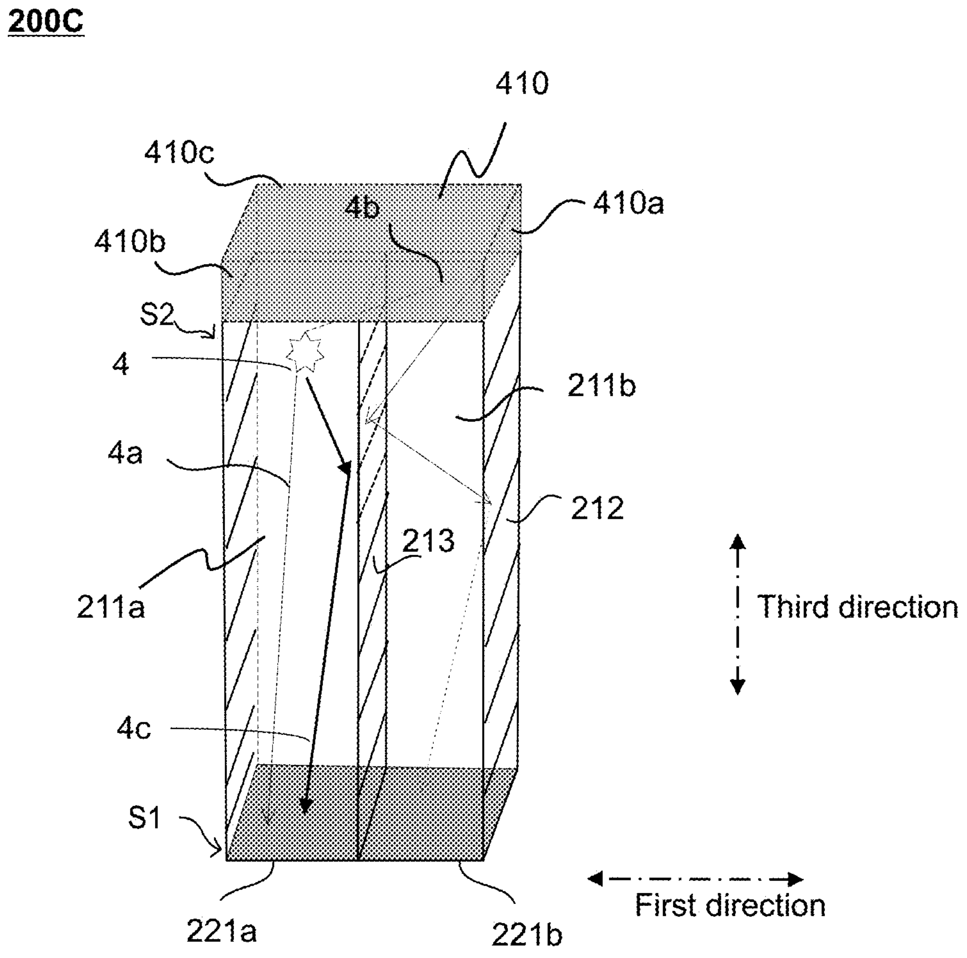
FIG. 4B is a schematic diagram illustrating an exemplary crystal group according to some embodiments of the present disclosure.

FIG. 4B is a schematic diagram illustrating an exemplary crystal group 200C according to some embodiments of the present disclosure.

The crystal group (or crystal element column) 200C may be similar to the crystal group 200A described in FIGS. 2-3B, except that the length of the second optical separator 213 is equal to at least one of the crystal elements 211*a* and 211*b* (i.e., the second optical separator 213 covers the crystal elements 211*a* or 211*b*) and the light transmission between crystal elements 211*a* and 211*b* in the crystal group 200C is realized through a light transmitter 410 arranged at the second end S2. As shown in FIG. 4B, the crystal group 200C may include crystal elements (e.g., the crystal elements 211*a*, 211*b*), optical sensors optically coupled with the crystal elements (e.g., the optical sensors 221*a*, 221*b*) (shown in a dark region in FIG. 4B), optical separators (e.g., the first optical separator 212, the second optical separator 213), and an optical bridge.

The optical bridge may include a light transmitter 410 covering second ends of the crystal elements 211*a* and 211*b* in the crystal group 200C. Each side surface (e.g., side surfaces 410*a* and 410*b*) and a surface 410*c* away from the second end S2 of the light transmitter 410 facing adjacent crystal groups of the crystal group 200C may be coated with a light-reflecting material to completely or substantially completely prevent photons in the crystal group 200C from exiting the light transmitter 410 from the side surfaces of the light transmitter 410. The light transmitter 410 may be made of any material (e.g., glass, scintillation crystals) that allows light to pass through. Photons excited by a photon gamma interaction occurring in one crystal element of the crystal group 200C may travel to the light transmitter 410, be reflected by the side surface of the light transmitter 410 one or more times, and then travel into another crystal element of the crystal group 200C. As shown in FIG. 4B, photons generated by a photon gamma interaction 4 in the crystal element 211*a* may travel through the light transmitter 410 (e.g., along a photon travel path 4*b*) into crystal element 211*b*.

A position of the photon gamma interaction occurring in the crystal group 200C may be determined based on output information of the optical sensors 221*a* and 221*b* optically coupled with the crystal group 200C. In some embodiments, the position of the photon gamma interaction may be determined based on the energy detected by the optical sensors 221*a* and 221*b*. For example, as shown in FIG. 4B, the photon gamma interaction 4 occurs at a position closer to the second end S2 than the first end S1 of the crystal element 211*a*. A portion of photons generated by the photon gamma interaction 4 may travel along photon travel paths 4*a* and 4*c* directly to the photon sensor 221*a* and be detected by the photon sensor 221*a*. A portion of the photons may travel along the photon travel path 4*b* through the light transmitter 410 into the crystal element 211*b*, and be detected by the photon sensor 221*b*.

In some embodiments, the position of the photon gamma interaction in the crystal group 200C may be determined based on time points at which the photons generated by the photon gamma interaction are received by the photon sensors 221*a* and 221*b*. Taking the photon gamma interaction 4 as an example, a time difference may be determined between a first time point at which the photon sensor 221*a* receives a photon (e.g., a photon traveling along the photon travel path 4*a*) and a second time point at which the photon sensor 221*b* receives a photon (e.g., a photon traveling along the photon travel path 4*b*). The DOI of the photon gamma interaction 4 may be estimated based on the time difference and the speed of light. A shorter time difference may indicate that the photon gamma interaction 4 occurs closer to the second end of the crystal element 211*a*.

According to the above descriptions, each of the crystal groups 200, 200B, and 200C has a U-shaped (or inverted U-shaped) structure that includes a U-shaped (or inverted U-shaped) optical path. The U-shape optical path refers to a path having a U-shape along which optical photons can be transmitted. The orientation of the U-shape optical path is not limited in the present disclosure, for example, the U-shape optical path is inverted for each of the crystal groups 200, 200B, and 200C. The light transmission may be realized at a position close to the second ends S2 of the crystal elements in the crystal group (i.e., corresponding to a lower portion of the U-shaped structure), and the light transmission may be avoided at a position close to the first ends S1 of the crystal elements in the crystal group (i.e., corresponding to an upper portion of the U-shaped structure or a lower portion of the inverted U-shaped structure). In the present disclosure, the crystal group with the U-shaped structure may be referred to as a U-shaped crystal group. A portion of the U-shaped crystal group that allows light to pass through may be referred to as an optical bridge or an optical window. For example, uncut ends of the crystal elements 211*a* and 211*b* in the crystal group 200B may be considered as the optical bridge. As another example, the light transmitter 410 in the crystal group 200C covering the second end S2 of the crystal elements 211*a* and 211*b* may be considered as a light bridge. As still another example, the light transmitter 214 in the crystal group 200A may be considered as a light bridge. It should be noted that the U-shaped crystal group may include more than two crystal elements, as long as the light transmission can be realized at the second ends of the crystal elements rather than the first ends of the crystal elements.

In some embodiments, the specially designed structure of the U-shaped crystal group can be used to determine DOI information, i.e., to determine a depth of the photon gamma interaction in the extension direction of the crystal element. In some embodiments, ECT detector assemblies (e.g., a U-shaped detector, a detector micro-block, etc.) having the DOI detection capability may be constructed based on the U-shaped crystal groups. More descriptions regarding the ECT detector assemblies may be found as described elsewhere in this disclosure (e.g., FIGS. 5A-6F and the relevant descriptions) hereinafter.

Figure 5A:
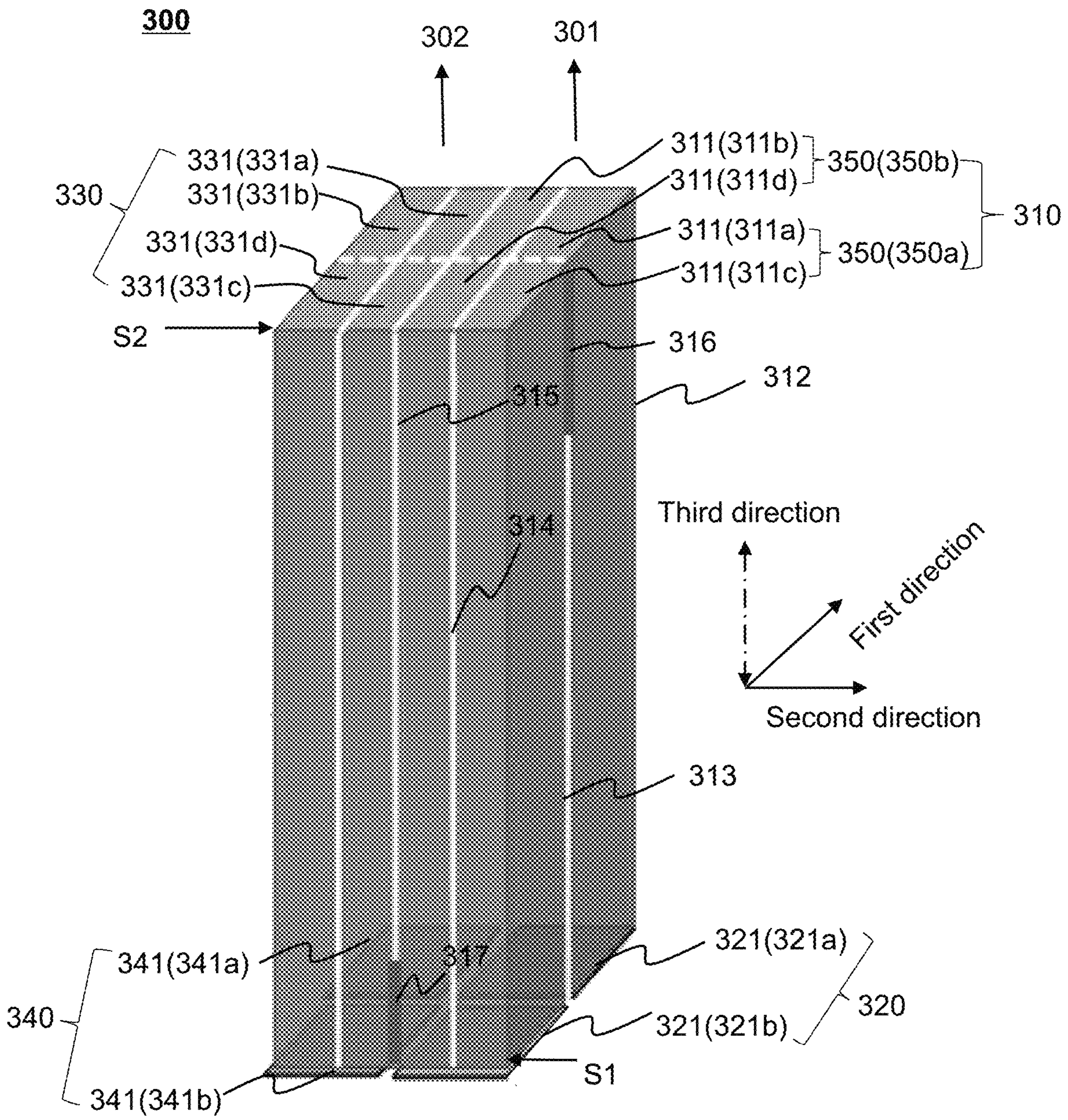
FIG. 5A is a schematic diagram illustrating an exemplary detector micro-block according to some embodiments of the present disclosure.
Figure 5B:
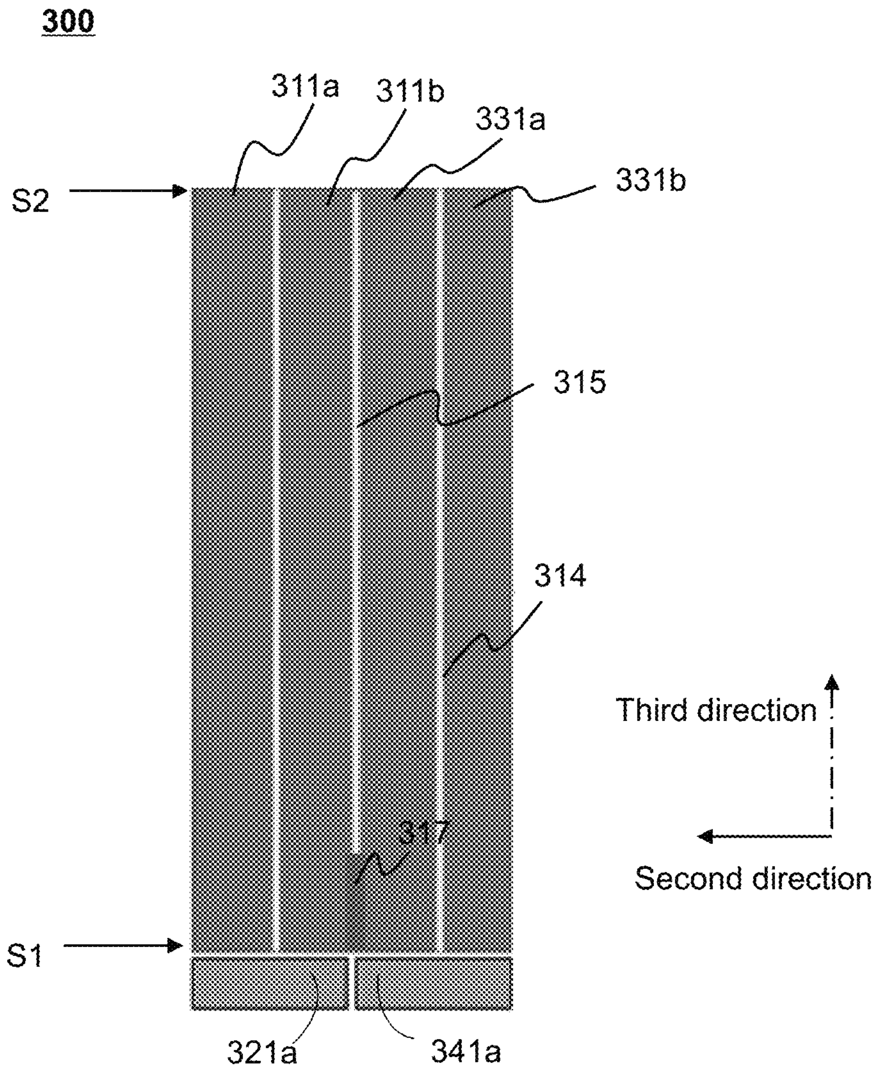
FIG. 5B is a schematic diagram illustrating a rear view of an exemplary detector micro-block according to some embodiments of the present disclosure.
Figure 5C:
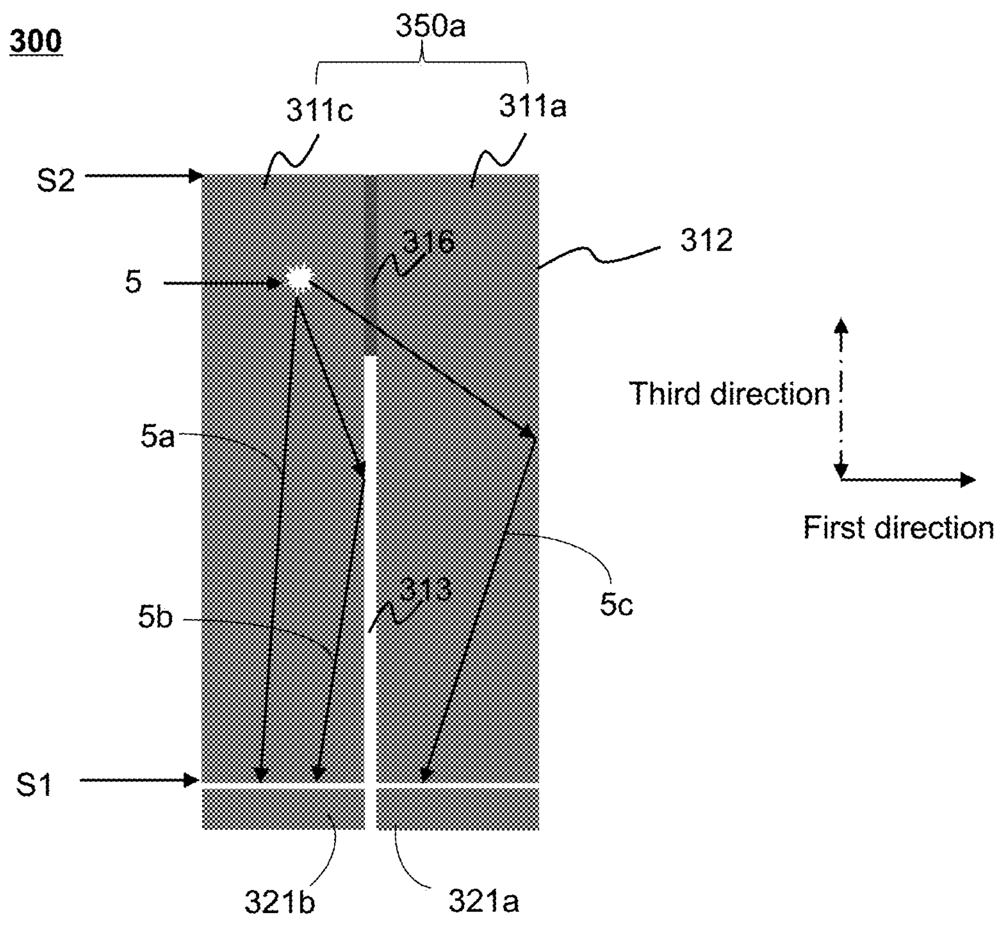
FIG. 5C is a schematic diagram illustrating a right view of an exemplary detector micro-block according to some embodiments of the present disclosure.
Figure 5D:
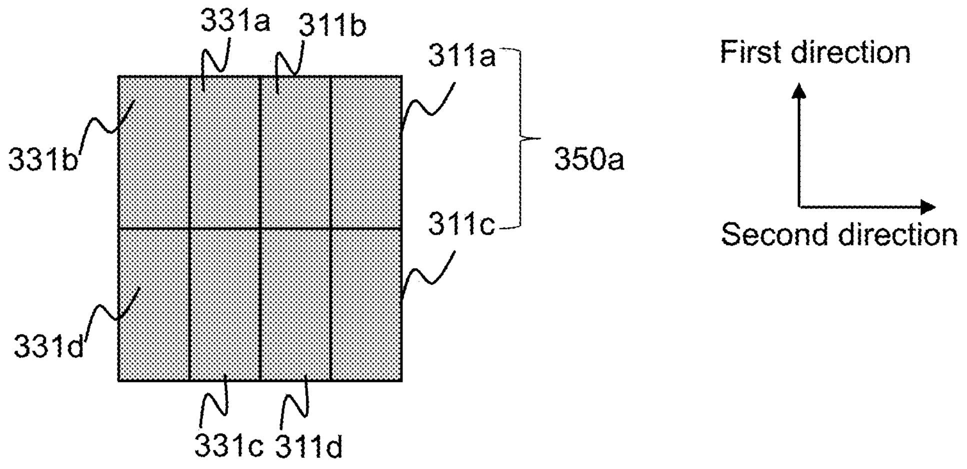
FIG. 5D is a schematic diagram illustrating a top view of an exemplary detector micro-block according to some embodiments of the present disclosure.

FIG. 5A is a schematic diagram illustrating an exemplary detector micro-block 300 according to some embodiments of the present disclosure. FIG. 5B is a schematic diagram illustrating a rear view of the detector micro-block 300 according to some embodiments of the present disclosure. FIG. 5C is a schematic diagram illustrating a right view of the detector micro-block 300 according to some embodiments of the present disclosure. FIG. 5D is a schematic diagram illustrating a top view of the detector micro-block 300 according to some embodiments of the present disclosure.

The detector micro-block 300 may be configured to detect annihilation photons generated by annihilation events during an ECT scan of an object. In some embodiments, the detector micro-block 300 may include one or more detector units. The detector units may be arranged side by side along a second direction. Each of the one or more detector units may include a plurality of U-shaped crystal groups (e.g., the crystal groups 200A, 200B, 200C). Similar to the U-shaped crystal group, the detector unit may have a U-shaped structure, and include a U-shaped optical path. Therefore, the detector unit may be also referred to as a U-shaped detector unit.

As shown in FIGS. 5A-5D, the detector micro-block 300 may include a first detector unit 301 and a second detector unit 302. The first detector unit 301 may include a crystal array 310, an optical sensor array 320 optically coupled with the crystal array 310, one or more optical separators, and an optical bridge. The crystal array 310 may include a plurality of crystal elements 311 (e.g., crystal elements 311*a*, 311*b*, 311*c*, 311*d*), and the plurality of crystal elements 311 may be arranged in crystal element columns (e.g., crystal element columns 350*a* and 350*b*) (also referred to as the crystal groups) along a first direction perpendicular to the second direction and crystal element rows along the second direction. For example, two crystal elements may be arranged in each crystal element column of the detector unit along the first direction, and two crystal elements may be arranged in each crystal element row of the detector unit along the second direction. Each of the plurality of crystal element 311 may have a first end S1 (e.g., a bottom end) and a second end S2 (e.g., an upper end), and extend from the first end S1 to the second end S2 along a third direction perpendicular to the first direction and the second direction. The optical sensor array 320 may include a plurality of optical sensors (e.g., optical sensors 321*a* and 321*b*), and the optical sensors 321*a* and 321*b* may be arranged along the first direction as an optical sensor column.

Similarly, the second detector unit 302 may include a crystal array 330, an optical sensor array 340 optically coupled with the crystal array 330, and one or more optical separators. The crystal array 330 may include a plurality of crystal elements 331 (e.g., crystal elements 331*a*, 331*b*, 331*c*, and 331*d*), and the optical sensor array 340 may include a plurality of optical sensors (e.g., optical sensors 341*a* and 341*b*). The optical bridge may be configured at the second ends of the crystal elements in each crystal element column.

Each crystal element (e.g., each of the crystal elements 311*a*, 311*b*, 311*c*, 311*d*, 331*a*, 331*b*, 331*c*, and 331*d*) may be configured to receive the annihilation photons from the object. As shown in FIG. 5A, the crystal elements 311 of the crystal array 310, and the crystal elements 331 of the crystal array 330 in the detector micro-block 300 may form two crystal element rows arranged along the second direction and four crystal element columns arranged along the first direction. In some embodiments, the second direction may be orthogonal or approximately orthogonal to the first direction. In some embodiments, both the first direction and the second direction may be orthogonal or approximately orthogonal to an extension direction (i.e., the third direction) of the crystal elements.

Each crystal element of the crystal array 310 and the crystal array 330 may be similar to the crystal elements described in FIGS. 2-4B. In some embodiments, each crystal element may have a long side along the first direction and a short side along the second direction. As used herein, the long side is referred to as a side of the crystal element that is parallel to the first direction (i.e., the direction in which crystal elements are arranged in the crystal group), and a short side is referred to as a side that is parallel to the second direction. For example, a length of the long side along the first direction may be determined based on a length of the optical sensor 221. As another example, a length of the long side along the first direction may be within a first range, e.g., a first range from 1 to 5 mm, a first range from 2 to 4.5 mm, a first range from 2.5 to 4 mm, a first range from 3 to 4 mm, etc. A length of the short side along the second direction may be in a second range, e.g., a second range from 1 to 5 mm, a second range from 1.5 to 4 mm, a second range from 2 to 3 mm, etc. In some embodiments, the length of the long side of the crystal element may be larger than the length of the short side of the crystal element. For example, a ratio of the length of the long side along the first direction to the length of the short side along the second direction may be larger than 1 and less than 5. For instance, the ratio of the length of the long side along the first direction and the length of the short side along the second direction may be 1.2, 1.5, 1.8, 2.0, 2.5, 3.0, 3.5, 4.0, 4.5, etc. Since an area (i.e., a product of the length of the long side of the crystal element and the length of the short side of the crystal element) of the crystal element is positively correlated to timing resolution of the crystal element, to ensure that the timing resolution satisfies actual requirement(s), the length of the short side of the crystal element may be larger than a length threshold of the short side. In addition, with the decrease of the length of the short side of the crystal element, a count of the crystal elements in the detector micro-block 300 may be increased, and a count of optical separators in the detector micro-block 300 may be increased, which reduces the sensitivity of the detector micro-block 300. Therefore, the length threshold of the short side may be determined by considering the timing resolution and the sensitivity of the detector micro-block 300. Merely by way of example, the length of the long side along the first direction may be 4.3 mm, and the length of the short side along the second direction may be 2.1 mm. As another example, the length of the long side along the first direction may be 3.0 mm, and the length of the short side along the second direction may be 1.5 mm. Since the length of the long side along the first direction is not equal to the length of the short side along the second direction, a resolution of the crystal element in the first direction may be different from a resolution in the second direction. Therefore, by arranging the detector micro-block 300 in different directions, output information with different resolutions may be collected.

In some embodiments, in each detector unit, crystal elements may form a plurality of U-shaped crystal groups along the first direction. Taking the first detector unit 301 as an example, the first detector unit 301 may include four crystal elements 311*a*, 311*b*, 311*c*, and 311*d* that form a 2×2 crystal array. The crystal elements 311*a* and 311*c* may form a crystal element column (or crystal group) 350*a*, and the crystal elements 311*b* and 311*d* may form a crystal element column (or crystal group) 350*b*. It should be noted that FIG. 5A is merely provided for illustration and is not intended to limit the scope of the present disclosure. Each crystal element column 350 may include any count of crystal elements 311.

The crystal element columns 350 may be similar to the crystal group 200A in FIG. 2, the crystal group 200B in FIG. 4A, or the crystal group 200C in FIG. 4B. Light transmission between and/or within the crystal groups may be controlled by using one or more first optical separators 312 and one or more second optical separators 313. The first optical separator 312 may be similar to the first optical separator 212, and the second optical separator 313 may be similar to the second optical separator 213, and relevant descriptions are not repeated here. For example, referring to FIG. 5C, a second optical separator 313 is configured between a pair of adjacent crystal elements 311*a* and 311*c* in the crystal element column 350*a*, and extends from first ends (e.g., bottom ends) S1 of the corresponding pair of adjacent crystal elements 311*a* and 311*c* without reaching second ends (e.g., upper ends) S2 of the corresponding pair of adjacent crystal elements 311*a* and 311*c* so as to partially block transmission of optical photons between the corresponding pair of adjacent crystal elements 311*a* and 311*c*. A light transmitter 316 may serve as the optical bridge and be configured between the pair of adjacent crystal elements 311*a* and 311*c* in the crystal element column 350*a*. The light transmitter 316 extends from the second ends S2 of the corresponding pair of adjacent crystal elements 311*a* and 311*c* to the second optical separator 313 between the corresponding pair of adjacent crystal elements 311*a* and 311*c*. That is, in the crystal element column 350*a*, the sum of a length of the light transmitter 316 and a length of the second optical separator 313 may be equal to a length of the crystal element 311*a* or 311*c* in the crystal element column 350*a*. By using the second optical separator 313 and the light transmitter 316, optical sharing of the crystal elements 311*a* and 311*c* in the crystal group 350*a* at the second end can be realized. As another example, the first optical separator 312 may be configured between adjacent crystal elements of adjacent detector micro-blocks.

In some embodiments, in each detector unit, the light transmission between neighboring crystal element columns may be controlled by applying a third optical separator 314. The third optical separator 314 may be configured between each pair of adjacent crystal element columns in the detector unit, and extend from the first ends of the crystal elements in the corresponding pair of adjacent crystal element columns to the second ends of the crystal elements in the corresponding pair of crystal element columns for blocking transmission of optical photons between the corresponding pair of crystal element columns. As shown in FIG. 5A and FIG. 5B, the third optical separator 314 is configured between the adjacent crystal element columns 350*a* and 350*b* in the detector unit 301, and the third optical separator 314 extends from the first ends S1 of the crystal elements 311*a*, 311*b*, 311*c*, and 311*d* in the corresponding pair of adjacent crystal element columns 350*a* and 350*b* to the second ends S2 of the crystal elements 311*a*, 311*b*, 311*c*, and 311*d* in the corresponding pair of crystal element columns 350*a* and 350*b* for blocking transmission of optical photons between the corresponding pair of crystal element columns 350*a* and 350*b*.

A length of each third optical separator 314 may be equal to or less than a length of at least one crystal element on either side thereof. Lengths of different third optical separators 314 may be the same or different. Merely by way of example, as shown in FIG. 5B, the length of the third optical separator 314 may be equal to the length of the crystal elements 311*a* and 311*b* for completely or substantially blocking the light transmission between the crystal element columns 350*a* and 350*b*. That is, the light transmission may be blocked between two crystal element columns of the same detector unit.

In some embodiments, in the detector micro-block 300, light transmission between detector units may be controlled by applying a fourth optical separator 315 and a second optical bridge 317. The fourth optical separator 315 may be configured between each pair of adjacent detector units in the detector micro-block, and extend from the second ends S2 of the crystal elements in the corresponding pair of adjacent detector units without reaching the first ends S1 of the crystal elements in the corresponding pair of adjacent detector units for partially block transmission of optical photons between the corresponding pair of adjacent detector units. The second optical bridge 317 may be configured between each pair of adjacent detector units in the detector micro-block, and extend from the first ends S1 of the crystal elements in the corresponding pair of adjacent detector units without reaching the second ends S2 of the crystal elements in the corresponding pair of adjacent detector units for allowing transmission of optical photons between the corresponding pair of adjacent detector units.

As shown in FIG. 5A and FIG. 5B, the fourth optical separator 315 and the second optical bridge 317 may be located between the first detector unit 301 and the second detector unit 302 adjacent to each other. For example, light transmission between the first detector unit 301 and the second detector unit 302 may be controlled by the fourth optical separator 315 and the second optical bridge 317. A length of the fourth optical separator 315 may be equal to or less than the length of the crystal element on either side thereof. The length of the fourth optical separator 315 in different detector micro-blocks 300 may be the same or different. Merely by way of example, as shown in FIGS. 5A and 5B, a portion of a space between the first detector unit 301 and the second detector unit 302 (e.g., between the crystal element 311*d* and 331*c*) is filled with the fourth optical separator 315 for avoiding light transmission between the crystal elements at the second ends S2, and another portion of the space is filled with the second optical bridge 317 for allowing transmission of optical photons between the first detector unit 301 and the second detector unit 302 at the first ends S1. In some embodiments, in the detector micro-block 300, the sum of a length of the second optical bridge 317 and a length of the fourth optical separator 315 may be equal to a length of the crystal elements of the detector micro-block 300

In some embodiments, the optical sensor array of each detector unit may include two optical sensors. Taking the first detector unit 301 as an example, an optical sensor array 320 may include two optical sensors 321 (e.g., 321*a* and 321*b*) arranged along the first direction. Each optical sensor 321 may be optically coupled with one or more crystal elements of the crystal array 310. For example, the first ends of the crystal elements in each crystal element row may be optically coupled with one optical sensor of the optical sensor array. Merely by way of example, as shown in FIGS. 5A-5C, the optical sensor 321*a* may completely cover the first ends S1 of the crystal elements 311*a* and 311*b* in the same row, and the optical sensor 321*b* may completely cover the first ends S1 of the crystal elements 311*c* and 311*d* in the same row, the optical sensor 341*a* may completely cover the first ends S1 of the crystal elements 331*a* and 331*b* in the same row, and the optical sensor 341*b* may completely cover the first ends S1 of the crystal elements 331*c* and 331*d* in the same row. The optical sensors may be located at ends of the crystal elements and be configured to detect optical photons from a single end of a corresponding crystal element. The optical sensor may be optically coupled with the corresponding crystal elements in any suitable manner as described elsewhere in the present disclosure (e.g., FIG. 2 and relevant descriptions thereof).

It should be noted that each optical sensor in FIGS. 5A-5D corresponding to two crystal elements along the second direction (i.e., a coupling ratio of the optical sensor to the crystal element is 1:2) is provided merely for purposes of illustration, and is not intended to limit the present scope of the present disclosure. For example, one optical sensor may correspond to one, three, four, or more crystal elements according to the crystal position recognition capability and/or light harvesting efficiency of the optical sensor.

By introducing the specially designed structure of the detector micro-block 300, position information of the photon gamma interaction occurring in the detector micro-block 300 may be determined based on output information of the plurality of optical sensors. For example, as shown in FIG. 5C, the photon gamma interaction 5 occurs at a position closer to the second end S2 than the first end S1 of the crystal element 311*c*. A portion of photons generated by the photon gamma interaction 5 may travel along photon travel paths 5*a* and 5*b* directly to the photon sensor 321*b* and be detected by the photon sensor 321*b*. A portion of the photons may travel along a photon travel path 5*c* through the light transmitter 316 into the crystal element 311*a*, and be detected by the photon sensor 321*a*. The position information of the photon gamma interaction 5 in the crystal element column 350*a* (i.e., the target crystal element column) in the first detector unit 301 may be determined based on the output information of the photon sensors 321*a* and 321*b*. The output information may reflect the energy of optical photons excited by the photon gamma interaction 5 and detected by the photon sensors 321*a* and/or 321*b*. In some embodiments, the depth of the photon gamma interaction 5 in the crystal element 311*c* in which the photon gamma interaction 5 occurs (also referred to as a target crystal element) may be determined based on the output information. More descriptions regarding the determination of the position information of the photon gamma interaction in the detector micro-block may be found elsewhere in the present disclosure. See, e.g., FIG. 8 and relevant descriptions thereof.

It should be noted that the above description is merely provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. For example, the detector micro-block 300 may include any suitable number or count of detector units. For instance, the detector micro-block 300 may include, e.g., three, four, five, six, etc., detector units.

FIGS. 6A-6F are schematic diagrams illustrating top views of exemplary detector blocks according to some embodiments of the present disclosure.

In some embodiments, a detector block may include a plurality of detector micro-blocks (e.g., the detector micro-block 300) arranged in a certain arrangement (or configuration) manner. For example, the plurality of detector micro-blocks 300 may be arranged in a block array. Merely by way of example, a number (or count) of detector micro-blocks 300 in the detector block may be determined based on sizes of the detector block and the detector micro-block 300.

In some embodiments, the plurality of detector micro-blocks 300 in the detector block may have a same orientation. For the convenience of description, a direction of a short side of each crystal element in the detector micro-block 300 may be defined as the orientation of the detector micro-block, and the orientation may be perpendicular to a plane formed by an extension direction and a direction of a long side of each crystal element in the detector micro-block 300. Taking the detector micro-block 300 in FIG. 5A as an example, the orientation of the detector micro-block 300 is indicated by an arrow parallel to the short sides of the crystal elements in the detector micro-block 300.

Figure 6A:
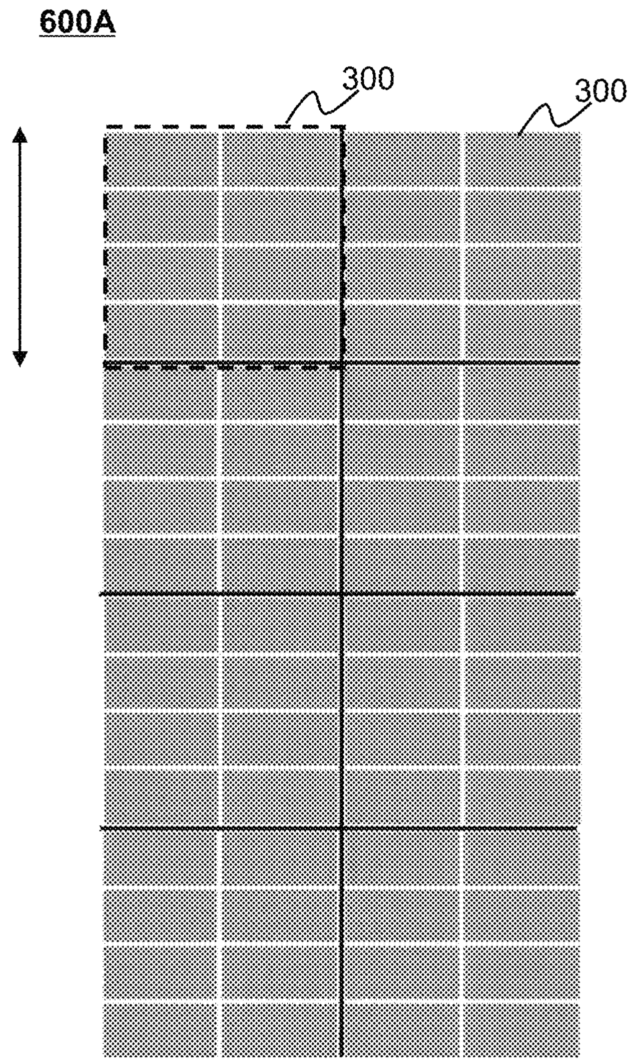
FIGS. 6A-6F are schematic diagrams illustrating top views of exemplary detector blocks according to some embodiments of the present disclosure.
Figure 6B:
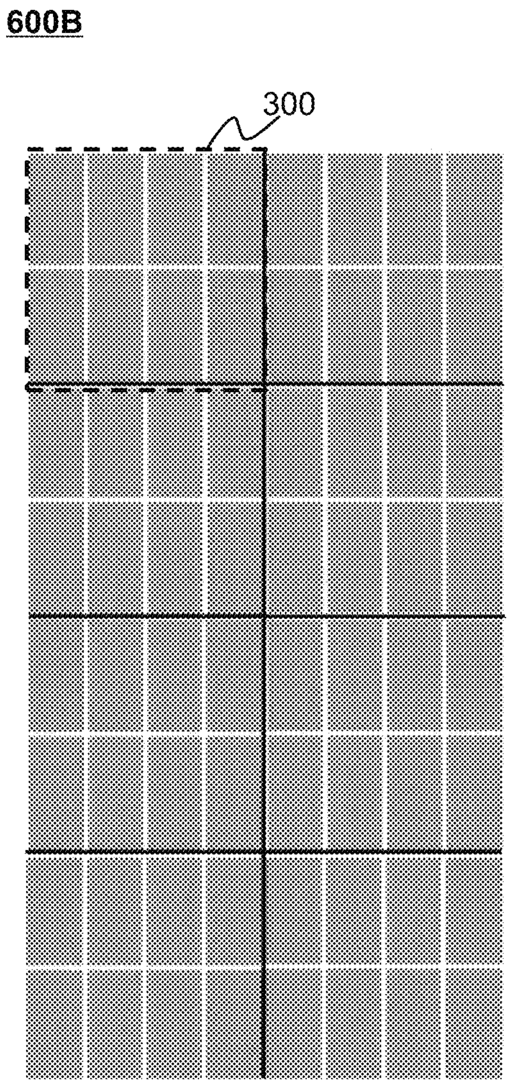

In some embodiments, the short sides of the crystal elements in the plurality of detector micro-blocks 300 may be parallel to each other. That is, an orientation of each of the plurality of detector micro-blocks 300 in the detector block may be the same. For example, as shown in FIG. 6A, a detector block 600A may include eight detector micro-blocks 300 with the same orientation that form a block array of four rows and two columns. Each crystal element in each detector micro-block 300 may have a long side parallel to a row direction of the block array and a short side parallel to a column direction of the block array. That is, the orientation of each detector micro-block 300 may be parallel to the column direction. As another example, as shown in FIG. 6B, a detector block 600B may include eight detector micro-blocks 300 that form a block array of four rows and two columns. Each crystal element in each detector micro-block 300 may have a long side parallel to a column direction of the block array and a short side parallel to a row direction of the block array. That is, the orientation of each detector micro-block 300 may be parallel to the row direction.

In some embodiments, the short sides of the crystal elements in one or more first detector micro-blocks of the plurality of detector micro-blocks 300 may be perpendicular to the short sides of the crystal elements in one or more second detector micro-blocks of the plurality of detector micro-blocks 300. That is, the plurality of detector micro-blocks 300 in the detector block may have different orientations.

Figure 6C:
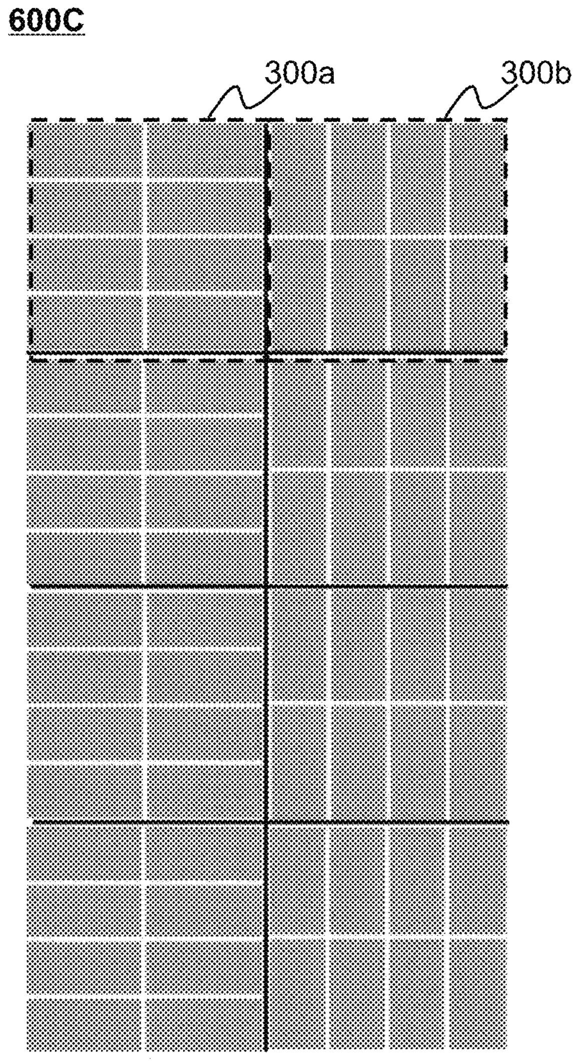

For example, as shown in FIG. 6C, the detector block 6000 may include eight detector micro-blocks 300 that form a block array of four rows and two columns. Four first detector micro-blocks 300*a* may form a left column, and four second detector micro-blocks 300*b* may form a right column. In the left column, an orientation of each first detector micro-block 300*a* may be parallel to the column direction. In the right column, an orientation of each second detector micro-block 300*b* may be parallel to the row direction. That is, the orientation of the first detector micro-blocks 300*a* in the left column may be perpendicular to the orientation of the second detector micro-block 300*b* in the right column.

Figure 6D:
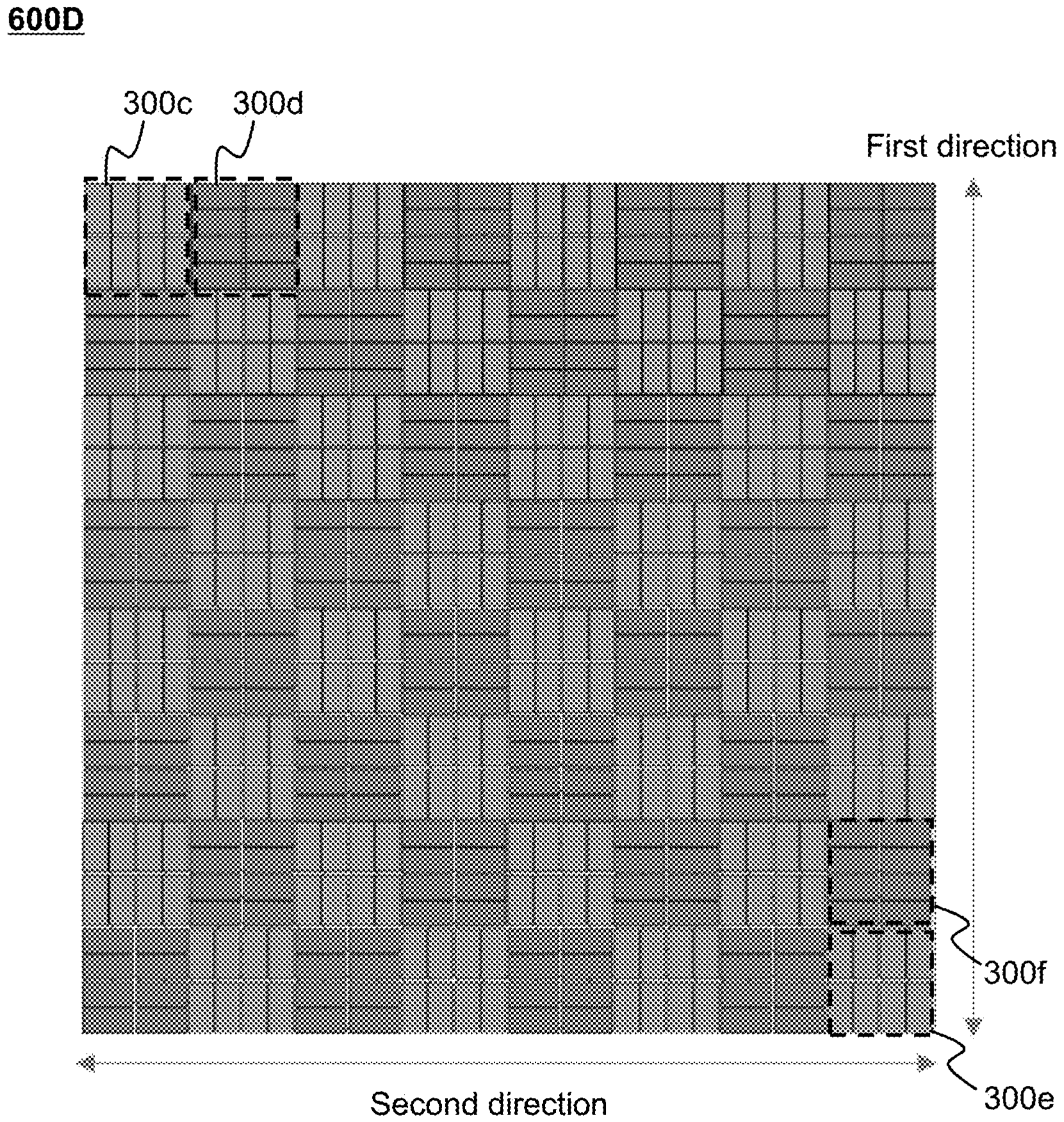

As another example, as shown in FIG. 6D, a detector block 600D may include 64 detector micro-blocks 300 that form a block array of eight rows and eight columns. The shorter sides of the crystal elements in each pair of adjacent detector micro-blocks in the plurality of detector micro-blocks may be perpendicular to each other to form a checkerboard structure. That is, each pair of adjacent detector micro-blocks in the plurality of detector micro-blocks may include one first detector micro-block and one second detector micro-block to form a checkerboard structure. Each pair of adjacent detector micro-blocks refers to two detector micro-blocks adjacent to each other in a same column or a same row. For instance, each pair of adjacent detector micro-blocks may include one detector micro-block 300*a* having an orientation parallel to the row direction and one detector micro-block 300*b* having an orientation parallel to the column direction. That is, orientations of two detector micro-blocks in each pair of neighboring detector micro-blocks 300 may be perpendicular to each other. Merely by way of example, as shown in FIG. 6D, the orientations of adjacent micro-blocks 300*c* and 300*d* are perpendicular to each other, and the orientations of adjacent micro-blocks 300*e* and 300*f* are perpendicular to each other. Therefore, the detector block 600D may have the checkerboard structure.

Figure 6E:
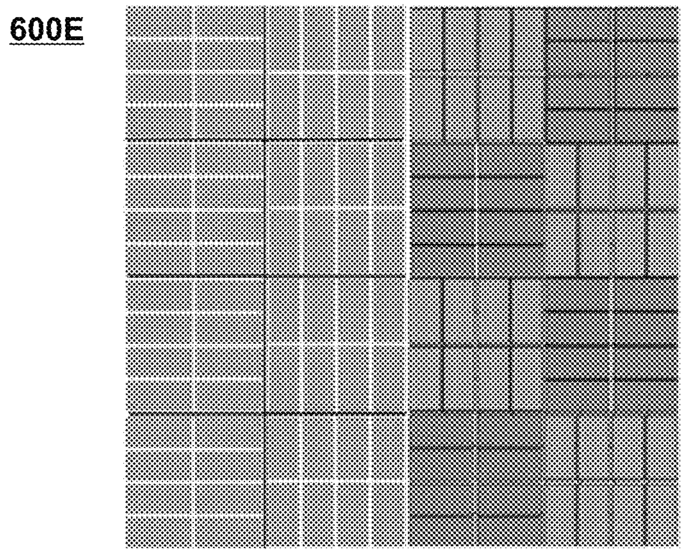

As still another example, as shown in FIG. 6E, the detector block 600E may include 16 detector micro-blocks 300 that form a block array of four rows and four columns. Two columns of detector micro-blocks on the left side may have a same arrangement manner as the detector block 6000, and two columns of detector micro-blocks on the right side may have a same arrangement manner as the detector block 600D.

Figure 6F:
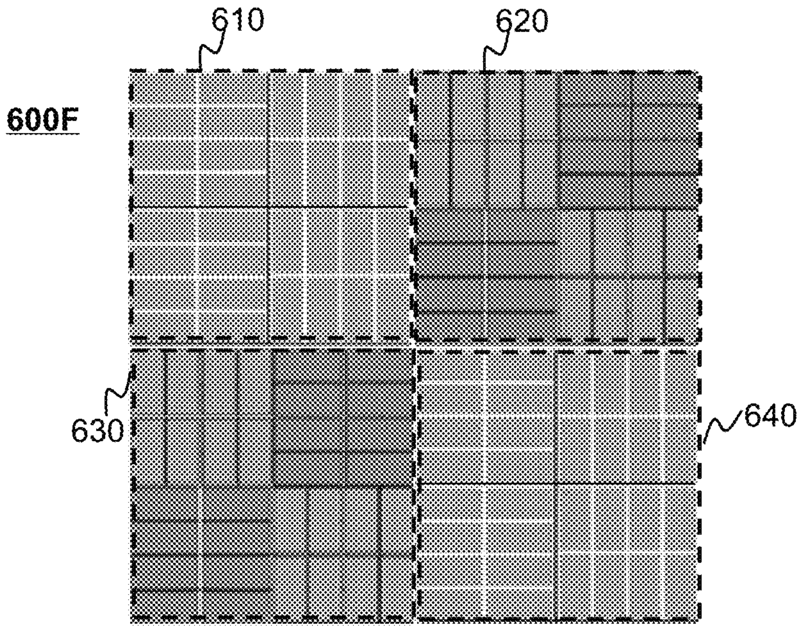

In some embodiments, the plurality of detector micro-blocks 300 in the detector block may include first sub-blocks and second sub-blocks. Each of the first sub-blocks and the second sub-blocks may include multiple detector micro-blocks, the detector micro-blocks of each first sub-block may have a first arrangement manner, and the detector micro-blocks of each second sub-block may have a second arrangement manner different from the first arrangement manner. Merely by way of example, as shown in FIG. 6F, a detector block 600F includes first sub-blocks 610 and 640, and the second sub-blocks 620 and 630. The first sub-blocks 610 and 640 may have the same arrangement manner as the detector block 6000, and the sub-blocks 620 and 630 may have the same arrangement manner as the detector block 600D.

In some embodiments, the plurality of detector micro-blocks 300 in a detector block may be randomly arranged. For example, the orientation of each detector micro-block 300 in the detector block may be randomly determined. For instance, when a parameter corresponding to the orientation is 0, the orientation of the detector micro-block 300 may be parallel to the column direction. When the parameter corresponding to the orientation is 1, the orientation of the detector micro-block 300 may be parallel to the row direction. A value of the parameter corresponding to the orientation of each detector micro-block 300 may be randomly determined based on a system default setting, or set manually by a user. Subsequently, the plurality of detector micro-blocks 300 may be arranged based on the value of the parameter corresponding to the orientation of each detector micro-block 300, so as to form the detector block. It should be noted that the parameter values of 0 and 1 are provided for illustration, and are not intended to limit the scope of the present disclosure.

In some embodiments, since the detector micro-block 300 has a U-shaped structure, a slotted/opening direction of the U-shaped structure of the detector micro-block 300 may be defined as the orientation of the detector micro-block. The slotted direction refers to a penetration direction of the slot in the U-shaped structure. For example, the slotted direction may be the second direction as shown in FIG. 5A.

Referring to FIGS. 6A-6D again, as shown in FIG. 6A, the orientation of each detector micro-block 300 in the detector block 600A is parallel to the column direction. As shown in FIG. 6B, the orientation of each detector micro-block 300 in the detector block 600B is parallel to the row direction. As shown in FIG. 6C, in the detector block 6000, the orientation of each detector micro-block 300*a* in the left column is parallel to the column direction, and the orientation of each detector micro-block 300*b* in the right column is parallel to the row direction. That is, the orientation of the detector micro-blocks 300*a* in the left column is perpendicular to the orientation of the detector micro-blocks 300*b* in the left column. As shown in FIG. 6D, the detector block 600D includes 64 detector micro-blocks 300 that form the block array of eight rows and eight columns. Each detector micro-block 300 in each row of detector micro-blocks in the detector block 600D that is parallel to a diagonal direction of the block array may have a same orientation, and orientations of adjacent rows of detector micro-blocks that are parallel to the diagonal direction may be perpendicular to each other. For example, a first row of detector micro-blocks from a detector micro-block 300*c* to detector micro-block 300*e* is parallel to the diagonal direction of the block array, and each detector micro-block 300 in the first row of detector micro-blocks has a same orientation that is parallel to the row direction of the block array. A second row of detector micro-blocks from the detector micro-block 300*d* to the detector micro-block 300*f* is parallel to the diagonal direction of the block array, and each detector micro-block 300 in the second row of detector micro-blocks has a same orientation that is parallel to the column direction of the block array. That is, the orientation of each detector micro-block 300 in the first row of detector micro-blocks may be perpendicular to the orientation of each detector micro-block 300 in the second row of detector micro-blocks.

By arranging the plurality of detector micro-blocks in different arrangement manners, a plurality of detector blocks can be designed, which can improve the applicability of the detector micro-blocks. In some embodiments, a detector block may include the one or more first detector micro-blocks and the one or more second detector micro-blocks, and the orientation of the one or more first detector micro-blocks is different from the orientation of the one or more second detector micro-blocks. Therefore, the detector block can be used to collect output information of different resolutions, which can increase the richness of the output information, thereby improving the accuracy of the position information of photon gamma interactions and ECT images generated based on the output information.

Figure 7:
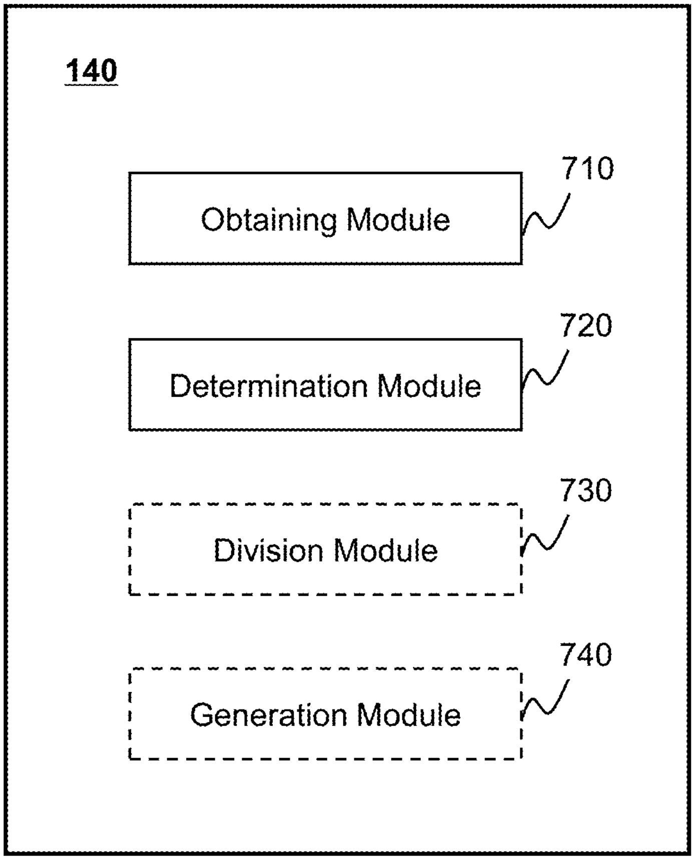
FIG. 7 is a block diagram illustrating an exemplary processing device according to some embodiments of the present disclosure.

FIG. 7 is a block diagram illustrating an exemplary processing device 140 according to some embodiments of the present disclosure. In some embodiments, the processing device 140 may be in communication with a computer-readable storage medium (e.g., the storage device 150 illustrated in FIG. 1) and execute instructions stored in the computer-readable storage medium. The processing device 140 may include an obtaining module 710 and a determination module 720.

The obtaining module 710 may be configured to obtain output information of optical sensors of a detector micro-block. More descriptions regarding the obtaining of the output information may be found elsewhere in the present disclosure. See, e.g., operation 802 and relevant descriptions thereof.

The determination module 720 may be configured to determine, based on the output information of the optical sensors, position information of the photon gamma interaction that occurs in the crystal elements of the detector micro-block. The position information may indicate a position of the photon gamma interaction that occurs in the crystal elements of the detector micro-block. More descriptions regarding the determination of the position information of the photon gamma interaction may be found elsewhere in the present disclosure. See, e.g., operation 804 and relevant descriptions thereof.

It should be noted that the above description regarding the processing device 140 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing device 140 may include a storage module configured to store data generated by the above-mentioned modules of the processing device 140. As another example, one or more modules may be integrated into a single module to perform the functions thereof.

Figure 8:
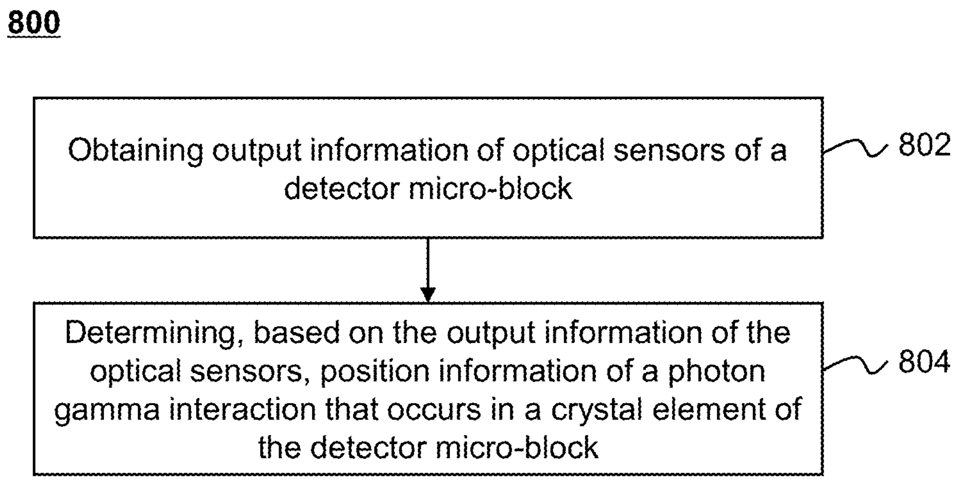
FIG. 8 is a flowchart illustrating an exemplary process for determining a position of a photon gamma interaction in a detector micro-block according to some embodiments of the present disclosure.

FIG. 8 is a flowchart illustrating an exemplary process 800 for determining a position of a photon gamma interaction in a detector micro-block according to some embodiments of the present disclosure. Process 800 may be implemented in the imaging system 100 illustrated in FIG. 1. For example, the process 800 may be stored in the storage device 150 in the form of instructions (e.g., an application), and invoked and/or executed by the processing device 140.

In 802, the processing device 140 (e.g., the obtaining module 710) may obtain output information of optical sensors of a detector micro-block.

The detector micro-block may be configured to detect annihilation photons generated by annihilation events during an ECT scan on an object. In some embodiments, the detector micro-block may include one or more detector units arranged side by side along a second direction. Each of the one or more detector units may include a plurality of crystal elements and an optical sensor array. The crystal elements may be arranged in crystal element columns along a first direction perpendicular to the second direction and crystal element rows along the second direction. The optical sensor array may include the optical sensors arranged along the first direction. More descriptions regarding the detector micro-block may be found elsewhere in the present disclosure. See, e.g., FIGS. 5A-5D and relevant descriptions thereof.

When a photon gamma interaction occurs in the detector micro-block coupled with the optical sensors, it may excite one or more optical photons, which may in turn be detected by at least one of the optical sensors of the detector micro-block. In response to the detected optical photons, the at least one of the optical sensors may output electrical signals, which are referred to as the output information herein. The output information may include a value of the energy detected by each of the at least one of the optical sensors. Alternatively, the output information may be a parameter other than the energy value, such as a signal intensity, a pulse width.

Taking the detector micro-block 300 as an example, when a photon gamma interaction occurs in the detector micro-block 300 coupled with the optical sensors 321*a*, 321*b*, 341*a*, and 341*b*, one or more optical photons may be excited by the photon gamma interaction, and be detected by at least one of the optical sensors 321*a*, 321*b*, 341*a*, and 341*b*. Correspondingly, the at least one of the optical sensors 321*a*, 321*b*, 341*a*, and 341*b* may output the output information.

In some embodiments, the processing device 140 may obtain the output information from the imaging device (e.g., the imaging device 110) or a storage device (e.g., the storage device 150, a database, or an external storage) that stores the output information.

In 804, the processing device 140 (e.g., the determination module 720) may determine, based on the output information of the optical sensors, position information of the photon gamma interaction that occurs in the crystal elements of the detector micro-block.

The position information may indicate a position of the photon gamma interaction that occurs in the crystal elements of the detector micro-block. For example, the position information may include a target crystal element column, a target crystal element, first position information of the photon gamma interaction along the first direction, second position information of the photon gamma interaction along the second direction, and third position information of the photon gamma interaction along a third direction that is perpendicular to the first direction and the second direction. The target crystal element column refers to a crystal element column where the photon gamma interaction occurs, and the target crystal element refers to a crystal element where the photon gamma interaction occurs.

In some embodiments, the processing device 140 may determine the target crystal element column based on the output information of the optical sensors. Taking the detector micro-block 300 as an example again, when the optical sensors 321*a* and 321*b* detect energy, and the optical sensors 341*a* and 341*b* detect no energy, or energy detected by the optical sensors 341*a* and 341*b* is less than an energy threshold, the processing device 140 may determine the crystal element column 350*a* as the target crystal element column. The energy threshold may indicate a minimum energy that the optical sensor can be regarded as detecting the photon gamma interaction. In some embodiments, the energy threshold may be determined based on a system default setting, or set manually by a user. As another example, when the optical sensors 321*a*, 321*b*, 341*a*, and 341*b* detect energy, the processing device 140 may determine the crystal element column 350*b* or a crystal element column including the crystal elements 331*a* and 331*c* as the target crystal element column(s).

In some embodiments, the processing device 140 may determine the target crystal element based on the output information of the optical sensors and the target crystal element column. For example, after the crystal element column 350*a* is determined as the target crystal element, the target crystal element may be determined by comparing the output information corresponding to the optical sensors 321*a* and 321*b*. For instance, if an energy value in the output information corresponding to the optical sensor 321*a* is larger than an energy value in the output information corresponding to the optical sensor 321*b*, the crystal element 311*a* may be determined as the target crystal element.

In some embodiments, the processing device 140 may determine the first position information and the second position information based on the output information of the optical sensors. For example, a center of gravity algorithm may be used to determine the first position information and the second position information of the photon gamma interaction occurring in the detector micro-block 300. The center of gravity algorithm may be represented by Equation (1):

$$\begin{cases} X = \dfrac{(A+B)-(C+D)}{A+B+C+D} \\ Y = \dfrac{(A+C)-(B+D)}{A+B+C+D} \end{cases}, \tag{1}$$

where X refers to an abscissa (i.e., the second position information) of a position where a photon gamma interaction occurs in the detector micro-block 300; Y refers to an ordinate (i.e., the first position information) of the position where the photon gamma interaction occurs in the detector micro-block 300; A refers to an energy detected by the optical sensor 341*b* corresponding to the crystal elements 331*c* and 331*d*; B refers to an energy detected by the optical sensor 321*b* corresponding to the crystal elements 311*c* and 311*d*; C refers to an energy detected by the optical sensor 341*a* corresponding to the crystal elements 331*a* and 331*b*; and D refers to an energy detected by the optical sensor 321*a* corresponding to the crystal elements 311*a* and 311*b*. In some embodiments, a coordinate system corresponding to the (X, Y) is established with an intersection point of the crystal elements 331*a*, 331*c*, 311*b*, and 311*d* as the ordinate origin, the second direction as an abscissa axis, and the first direction as an ordinate axis.

In some embodiments, the processing device 140 may determine the target crystal element column and/or the target crystal element based on the first position information and the second position information. For example, the processing device 140 may determine the target crystal element column and/or the target crystal element based on the abscissa X and the ordinate Y of the position where the photon gamma interaction occurs in the detector micro-block 300.

In some embodiments, the third position information of the photon gamma interaction may be determined based on the output information of the optical sensors, the first position information, and the second position information. The third position information refers to a depth (i.e., the DOI) of the photon gamma interaction along the third direction in the target crystal element. For example, the DOI may include a distance between the photon gamma interaction and the first end S1 of the target crystal element along the extension direction (i.e., the third direction) of the target crystal element.

In some embodiments, after the first position information and the second position information are determined, the processing device 140 may determine the target crystal element, the target crystal element column, a target optical sensor in the optical sensors corresponding to the target crystal element, and an auxiliary optical sensor other than the target optical sensor in the optical sensors corresponding to the target crystal element column. Then, the processing device 140 may determine the DOI based on first output information detected by the target optical sensor and second output information detected by the auxiliary optical sensor. For example, the DOI may be determined based on a ratio of the energy detected by the target optical sensor to the energy detected by the auxiliary optical sensor. For example, the DOI d of the photon gamma interaction within the target crystal element may be determined according to Equation (2):

$$d = LUT[E1/(E1+E2)], \tag{2}$$

where E1 represents the energy detected by the target optical sensor; E2 represents the energy detected by the auxiliary optical sensor; and LUT represents an operation of looking up a lookup table. The lookup table may refer to a table that records a relationship between depths of photon gamma interactions in a target crystal element and values of E1/(E1+E2). In some embodiments, the lookup table may be determined based on a plurality of depths of photon gamma interactions and their corresponding values of E1/(E1+E2). The lookup table may be stored in a storage device (e.g., the storage device 150) of the imaging system 100. In the determination of the DOI, the processing device 140 may retrieve the lookup table from the storage device and determine the DOI d of the photon gamma interaction by searching the lookup table.

In some embodiments, the processing device 140 may generate an ECT image based on the DOIs of the photon gamma interactions. For example, the processing device 140 may generate lines of response (LORs) based on the DOIs of the photon gamma interactions, and generate the ECT image by processing the LORs. By generating the LORs based on the DOIs of the photon gamma interactions, the accuracy of the LORs can be improved, which can improve the spatial resolution and temporal resolution, thereby improving the accuracy of the PET image.

According to some embodiments of the present disclosure, by introducing the specially designed structure of the U-shaped detector micro-block, the position information of the photon gamma interaction that occurs in the crystal elements of the detector micro-block can be determined based on the output information of the optical sensors, which can improve the resolution (e.g., the spatial resolution) of the output information, thereby improving the accuracy of ECT images generated based on the output information. In addition, by using the U-shaped detector micro-block, the amount of data (e.g., the output information) that needs to be processed can be reduced, which can improve the efficiency of data processing.

Figure 9:
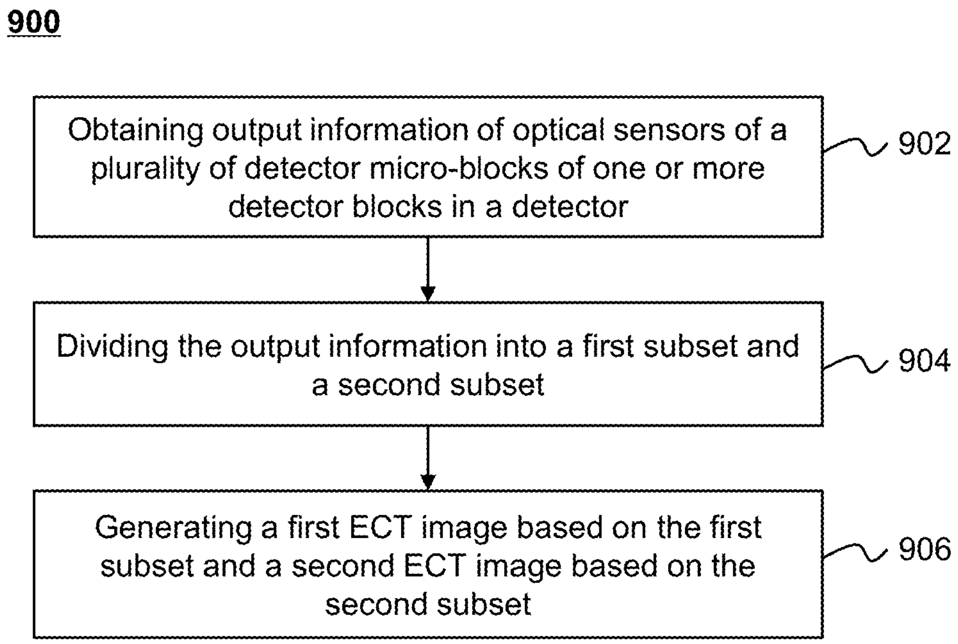
FIG. 9 is a flowchart illustrating an exemplary process for ECT imaging according to some embodiments of the present disclosure.

FIG. 9 is a flowchart illustrating an exemplary process 900 for ECT according to some embodiments of the present disclosure. Process 900 may be implemented in the imaging system 100 illustrated in FIG. 1. For example, the process 900 may be stored in the storage device 150 in the form of instructions (e.g., an application), and invoked and/or executed by the processing device 140.

In 902, the processing device 140 (e.g., the obtaining module 710) may obtain output information of optical sensors of a plurality of detector micro-blocks of one or more detector blocks in a detector.

In some embodiments, when an imaging device (e.g., the imaging device 110) is used to perform an ECT scan on an object, the optical sensors of the plurality of detector micro-blocks of the one or more detector blocks in the detector of the imaging device may collect the output information. For each of the optical sensors, the output information may be obtained in a similar manner as how the output information is obtained in operation 802, which is not repeated herein.

In 904, the processing device 140 (e.g., the division module 730) may divide the output information into a first subset and a second subset.

The first subset may correspond to the optical sensors of one or more first detector micro-blocks, and the second subset may correspond to the optical sensors of one or more second detector micro-blocks. In some embodiments, the plurality of detector micro-blocks may include the one or more first detector micro-blocks and the one or more second detector micro-blocks. The short sides of the crystal elements in the one or more first detector micro-blocks may be perpendicular to the short sides of the crystal elements in the one or more second detector micro-blocks. For example, the short sides of the crystal elements in the one or more first detector micro-blocks of the plurality of detector micro-blocks may be parallel to a row direction of the block array, and the short sides of the crystal elements in the one or more second detector micro-blocks of the plurality of detector micro-blocks may be parallel to a column direction of the block array. More descriptions regarding the one or more first detector micro-blocks and the one or more second detector micro-blocks may be found elsewhere in the present disclosure. See, e.g., FIGS. 6C-6F and relevant descriptions thereof.

For example, the processing device 140 may divide the output information into the first subset and the second subset based on whether the corresponding optical sensor belongs to the first detector micro-blocks or the second detector micro-blocks.

In 906, the processing device 140 (e.g., the generation module 740) may generate a first ECT image based on the first subset, and generate a second ECT image based on the second subset.

In some embodiments, the processing device 140 may generate the first ECT image by reconstructing the first subset using a first imaging reconstruction algorithm. Exemplary imaging reconstruction algorithms may include an analytical algorithm (e.g., a filtered back projection algorithm), an iteration algorithm, a maximum likelihood expectation-maximization (MLEM) algorithm, an ordered subset expectation maximization (OSEM) algorithm, or the like, or any combination thereof. Similarly, the second ECT image may be generated by reconstructing the second subset using a second imaging reconstruction algorithm. The second imaging reconstruction algorithm may be the same as or different from the first imaging reconstruction algorithm.

Since the short sides of the crystal elements in the one or more first detector micro-blocks of the plurality of detector micro-blocks are perpendicular to the short sides of the crystal elements in the one or more second detector micro-blocks of the plurality of detector micro-blocks, a full width at half maximum (FWHM) of the crystal elements of the first detector micro-block may be different from that of the crystal elements of the second detector micro-block. Therefore, the resolution of the first subset may be different from the resolution of the second subset. The resolution refers to a timing resolution, a spatial resolution, an action depth resolution, or the like, or any combination thereof. For example, referring to FIG. 6D, since the FWHM of the crystal elements of the detector micro-block **300*c* along the first direction is larger than the FWHM of the crystal elements of the detector micro-block 300*d* along the first direction, the resolution (e.g., the spatial resolution) of the first subset along the first direction may be greater than the resolution of the second subset along the first direction. Correspondingly, a first image resolution of the first ECT image along the first direction may be greater than a second image resolution of the second ECT image along the first direction. Similarly, the first image resolution of the first ECT image along the second direction may be greater than the second image resolution of the second ECT image along the second direction In some embodiments, the processing device 140** may generate a third ECT image based on the first subset and the second subset. For example, the third ECT image may be generated by reconstructing the first subset and the second subset using a third imaging reconstruction algorithm. The third imaging reconstruction algorithm may be the same as or different from the first imaging reconstruction algorithm and/or the second imaging reconstruction algorithm.

Since the third ECT image is generated based on the first subset and the second subset, a third image resolution along the first direction of the third ECT image may be greater than the second image resolution of the second ECT image along the first direction, and less than the first image resolution of the first ECT image along the first direction. The third image resolution along the second direction of the third ECT image may be less than the second image resolution of the second ECT image along the second direction, and greater than the first image resolution of the first ECT image along the second direction.

According to some embodiments of the present disclosure, the first ECT image, the second ECT image, and the third ECT image with different image resolutions can be generated based on the first subset and the second subset. Therefore, the systems and methods disclosed herein may meet different imaging requirements and have a wider application range.

Figure 10:
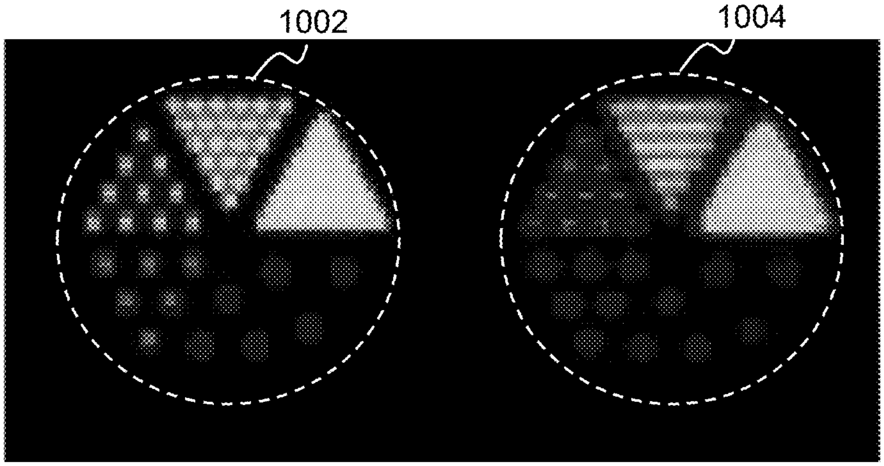
FIG. 10 is a diagram illustrating exemplary reconstructed images according to some embodiments of the present disclosure.

For example, by arranging the detector micro-blocks in a checkerboard structure, the imaging effect (e.g., resolution) of the detector can be improved. Merely by way of example, as shown in FIG. 10, an image in box 1002 has a higher image resolution than an image in box 1004, wherein the image in box 1002 is obtained using a detector with the checkerboard structure, and the image in box 1004 is obtained using a conventional detector.

It should be noted that the descriptions of the processes 800 and 900 are provided for the purposes of illustration, and are not intended to limit the scope of the present disclosure. For persons having ordinary skills in the art, various variations and modifications may be conducted under the teaching of the present disclosure. For example, the processes 800 and 900 may be accomplished with one or more additional operations not described, and/or without one or more of the operations discussed. Additionally, the order in which the operations of the processes 800 and 900 are not intended to be limiting. However, those variations and modifications may not depart from the protection of the present disclosure.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term “about,” “approximate,” or “substantially.” For example, “about,” “approximate,” or “substantially” may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A detector micro-block for emission computed tomography (ECT), comprising:
- a plurality of detector micro-blocks arranged in a block array, wherein each of the plurality of detector micro-blocks includes:
  - detector units arranged side by side along a second direction, wherein each of the detector units includes:
    - crystal elements that are arranged in crystal element rows along the second direction and crystal element columns along a first direction perpendicular to the second direction, each crystal element having a first end and a second end and extending from the first end to the second end along a third direction perpendicular to the first direction and the second direction; and
    - an optical sensor array including optical sensors arranged along the first direction; wherein
      - the first ends of the crystal elements in each crystal element row are optically coupled with one optical sensor of the optical sensor array, and
      - an optical bridge is configured at the second ends of the crystal elements in each crystal element column,
      - each crystal element has a long side along the first direction and a short side along the second direction, and
      - the length of the long side along the first direction is larger than the length of the short side along the second direction, and
  - short sides of the crystal elements in one or more first detector micro-blocks of the plurality of detector micro-blocks are perpendicular to the short sides of the crystal elements in one or more second detector micro-blocks of the plurality of detector micro-blocks.

2. The detector block of claim 1, wherein for each crystal element column of each detector unit,
- an optical separator is configured between each pair of adjacent crystal elements in the crystal element column,
- the optical separator extends from the first ends of the corresponding pair of adjacent crystal elements without reaching the second ends of the corresponding pair of adjacent crystal elements.

3. The detector block of claim 2, wherein the second ends of the crystal elements in each crystal element column are integrated into an integral part that serves as the optical bridge.

4. The detector block of claim 2, wherein the optical bridge of each crystal element column comprises:
- a light transmitter configured between each pair of adjacent crystal elements in the crystal element column,
- the light transmitter extends from the second ends of the corresponding pair of adjacent crystal elements to the optical separator between the corresponding pair of adjacent crystal elements.

5. The detector block of claim 1, wherein for each detector unit,
- an optical separator is configured between each pair of adjacent crystal element columns in the detector unit,
- the optical separator extends from the first ends of the crystal elements in the corresponding pair of adjacent crystal element columns to the second ends of the crystal elements in the corresponding pair of crystal element columns.

6. The detector block of claim 1, wherein
- for each crystal element column of each detector unit,
  - an optical separator is configured between each pair of adjacent crystal elements in the crystal element column, the optical separator extends from the first ends of the corresponding pair of adjacent crystal elements to the second ends of the corresponding pair of adjacent crystal elements, and the optical bridge includes a light transmitter covering the second ends of the crystal elements in the crystal element column.

7. The detector block of claim 1, wherein a second optical bridge is configured between each pair of adjacent detector units in the detector micro-block.

8. The detector block of claim 1, wherein an optical separator is configured between each pair of adjacent detector units in the detector micro-block, the optical separator extends from the second ends of the crystal elements in the corresponding pair of adjacent detector units without reaching the first ends of the crystal elements in the corresponding pair of adjacent detector units.

9. The detector block of claim 1, wherein for each detector unit, two crystal elements are arranged in each crystal element column of the detector unit along the first direction, and two crystal elements are arranged in each crystal element row of the detector unit along the second direction.

10. The detector block of claim 1, wherein a ratio of the length of the long side along the first direction to the length of the short side along the second direction is greater than 1 and less than 5.

11. The detector block of claim 1, wherein each pair of adjacent detector micro-blocks in the plurality of detector micro-blocks includes one first detector micro-block and one second detector block to form a checkerboard structure.

12. The detector block of claim 1, wherein the detector block includes first sub-blocks and second sub-blocks, each of the first sub-blocks and the second sub-blocks includes multiple detector micro-blocks, the detector micro-blocks of each first sub-block have a first arrangement manner, the detector micro-blocks of each second sub-block have a second arrangement manner different from the first arrangement manner.

13. A method for identifying positions of photon gamma interactions, implemented on a computing machine having one or more processors and one or more storage devices, the method comprising:

obtaining output information of the optical sensors of the detector block according to claim 1; and determining, based on the output information of the optical sensors, position information of a photon gamma interaction that occurs in the crystal elements of the detector block according to claim 1.

14. The detector block of claim 1, wherein a first row of detector micro-blocks of the plurality of detector micro-blocks is parallel to a diagonal direction of the block array, a second row of detector micro-blocks of the plurality of detector micro-blocks is parallel to the diagonal direction of the block array, and an orientation of each detector micro-block in the first row of detector micro-blocks is perpendicular to an orientation of each detector micro-block in the second row of detector micro-blocks.

15. The detector block of claim 1, wherein the block array comprises a first column and a second column, the first column comprises the one or more first detector micro-blocks, the second column comprises the one or more second detector micro-blocks, the short sides of the crystal elements in the one or more first detector micro-blocks are parallel to a column direction of the block array, and the short sides of the crystal elements in the one or more second detector micro-blocks are perpendicular to the column direction of the block array.

16. The detector block of claim 12, wherein the first arrangement is that all detector micro-blocks in each first sub-block have a same orientation, the second arrangement is that each pair of adjacent detector micro-blocks in each second sub-block has different orientations.

17. A method for emission computed tomography (ECT), implemented on a computing machine having one or more processors and one or more storage devices, the method comprising:

obtaining output information of optical sensors of a plurality of detector micro-blocks of a detector block, wherein the detector block includes the plurality of detector micro-blocks arranged in a block array, and each of the plurality of detector micro-blocks includes:

detector units arranged side by side along a second direction, wherein each of the detector units includes:

crystal elements that are arranged in crystal element rows along the second direction and crystal element columns along a first direction perpendicular to the second direction, each crystal element having a first end and a second end and extending from the first end to the second end along a third direction perpendicular to the first direction and the second direction; and an optical sensor array including optical sensors arranged along the first direction; wherein the first ends of the crystal elements in each crystal element row are optically coupled with one optical sensor of the optical sensor array, an optical bridge is configured at the second ends of the crystal elements in each crystal element column, each crystal element has a long side along the first direction and a short side along the second direction, and the length of the long side along the first direction is larger than the length of the short side along the second direction, and short sides of the crystal elements in one or more first detector micro-blocks of the plurality of detector micro-blocks are perpendicular to the short sides of the crystal elements in one or more second detector micro-blocks of the plurality of detector micro-blocks;

dividing the output information into a first subset and a second subset, the first subset corresponding to the optical sensors of the one or more first detector micro-blocks, the second subset corresponding to the optical sensors of the one or more second detector micro-blocks;

generating a first ECT image based on the first subset; and generating a second ECT image based on the second subset.

18. The method of claim 17, wherein a first image resolution of the first ECT image along the first direction is greater than a second image resolution of the second ECT image along the first direction, and the first image resolution of the first ECT image along the second direction is greater than the second image resolution of the second ECT image along the second direction.

19. The method of claim 17, wherein a first image resolution of the first ECT image along the first direction is greater than a second image resolution of the second ECT image along the first direction, and the first image resolution of the first ECT image along the second direction is less than the second image resolution of the second ECT image along the second direction.

20. The method of claim 17, further comprising:

generating a third ECT image based on the first subset and the second subset.

* * * * *